United States Patent
Ji

(10) Patent No.: US 7,336,820 B2
(45) Date of Patent: Feb. 26, 2008

(54) METHOD AND APPARATUS FOR RAPID SHADING IN A RASTER IMAGE PROCESSOR

(75) Inventor: Lilian Ji, Ultimo (AU)

(73) Assignees: Kabushiki Kaisha Toshiba (JP); Toshiba Tec Kabushiki Kaisha (JP)

(*) Notice: Subject to any disclaimer, the term of this patent is extended or adjusted under 35 U.S.C. 154(b) by 547 days.

(21) Appl. No.: 11/051,856

(22) Filed: Feb. 4, 2005

(65) Prior Publication Data
US 2006/0176304 A1  Aug. 10, 2006

(51) Int. Cl.
*G06K 9/00* (2006.01)
*G06K 9/48* (2006.01)

(52) U.S. Cl. .................................. 382/167

(58) Field of Classification Search ............ 382/162, 382/164, 165–167, 181, 193, 199, 202, 276, 382/277, 300; 345/600–604; 358/515, 518, 358/520, 523, 525, 530
See application file for complete search history.

(56) References Cited

U.S. PATENT DOCUMENTS

| | | | |
|---|---|---|---|
| 5,311,336 A * | 5/1994 | Kurita et al. ............ | 358/538 |
| 5,414,535 A * | 5/1995 | Kanmoto et al. ......... | 358/487 |
| 6,020,897 A | 2/2000 | Carlsen et al. | |
| 6,026,216 A | 2/2000 | Ohtsuka et al. | |
| 6,075,614 A | 6/2000 | Ohtsuka et al. | |
| 6,302,522 B1 | 10/2001 | Rumph et al. | |
| 6,515,763 B1 | 2/2003 | Dermer et al. | |
| 6,588,879 B2 | 7/2003 | Kushner et al. | |
| 6,674,905 B1 * | 1/2004 | Matsugu et al. .......... | 382/199 |
| 6,736,485 B2 | 5/2004 | Kushner et al. | |
| 6,812,933 B1 * | 11/2004 | Silver ..................... | 345/619 |
| 7,231,098 B2 * | 6/2007 | Wang ...................... | 382/274 |
| 2002/0093684 A1 | 7/2002 | Bares et al. | |
| 2003/0122894 A1 | 7/2003 | Kushner et al. | |
| 2003/0169321 A1 | 9/2003 | Kushner et al. | |
| 2003/0218780 A1 | 11/2003 | Braun et al. | |
| 2004/0032600 A1 | 2/2004 | Burns et al. | |

* cited by examiner

*Primary Examiner*—Amir Alavi
(74) *Attorney, Agent, or Firm*—Tucker Ellis & West LLP

(57) ABSTRACT

Methods of mapping the shading dictionary parameters provided by a postscript language interpreter into device space coordinates and performing shading in the device space is disclosed. For radial shading, the shading transformation matrix representing the coordinate conversion from the shading space to device space is embedded within the shading mechanism parameters to directly compute the shading color for a particular device space pixel, avoiding device coordinate transformations to the shading space. For triangle meshes based shading, the vertexes of the defined triangles are converted to device domain prior to performing interpolation for determining device pixel shading color. For patch based shading, comprising of patches bounded by four Bezier curves, the Bezier curves are converted to the device domain to directly compute the corresponding shading parameter variables for a particular device pixel.

25 Claims, 10 Drawing Sheets

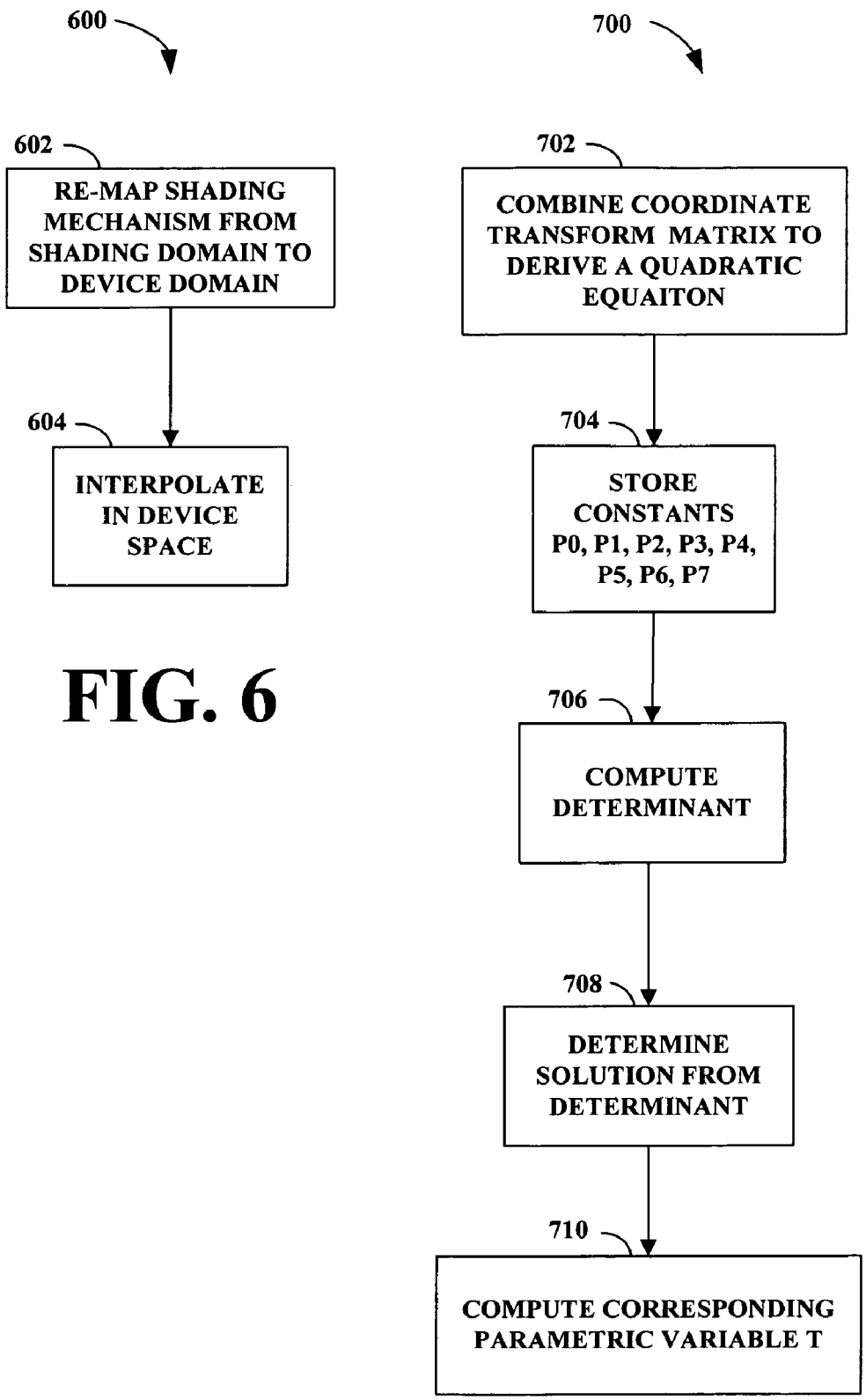

1-D linear interpolation (m=1 and Order=1 or $Size_1 < 4$)

2-D cubic spline interpolation (m=1, Order=3 or $Size_1 \geq 4$)

2-D cubic spline interpolation
(m=1, Order=3 or $Size_1 \geq 4$)

METHOD AND APPARATUS FOR RAPID SHADING IN A RASTER IMAGE PROCESSOR

BACKGROUND OF THE INVENTION

This invention relates generally to raster graphics systems and more specifically to shading operations.

In a raster graphics system, smooth shading in colour is used for two main operations. The first is to fill directly in a geometrically defined area, and the second is to produce shading patterns and then paint a defined area with the smooth colour transition. There is a plurality of methods to define such shading mechanisms. In a raster image processor related to a printer, the Postscript Language Reference Manual defines seven types of shading and parameters via shading dictionaries. The Postscript Language Reference, Third Edition, Adobe Systems, Inc., published by Addison Wesley Publishing, is hereby incorporated by reference.

Shading provides a smooth transition between colours across an area to be painted, independent of the resolution of any particular output device and without specifying the number of steps in the colour transition. If the shading area is a simple geometric shape, the shading operations can be performed directly to paint the corresponding device pixels with the shading colour defined in a shading dictionary. However, in most cases, the required shading area is comprised of complicated geometric shapes, which warrant the definition of a shading pattern. In the Postscript Language reference manual, a Type 2 shading pattern dictionary defines this type of shading patterns. Such a pattern dictionary contains the entry of a shading dictionary. The shading dictionary specifies details of a particular gradient fill, including the type of shading to be used, the geometry of the area to be shaded, and the geometry of the gradient fill itself. In addition, the shading dictionary can contain a function dictionary—which is required for some types of shading and optional for others—that defines how the colour or colours vary across the area to be shaded. The seven types of shading can be grouped in to several categories including function-based shading, axial shading, radial shading, triangle meshes based shading and patch meshes based shading.

In a raster graphics system, the output device contains a predefined number of pixels arranged in a predefined layout, with an inherent device resolution. A particular device's coordinate system is named the device space. A device space origin can be anywhere on the output, depending on the usage of the device. When painting pixels on the device, each device pixel needs to be painted as defined by the painting instruction. Coordinates specified in a Postscript program refer to locations within a coordinate system, named user space, which always bears the same relationship to the current page, regardless of the output device.

The coordinate transformation from the user space to the device space is achieved using the current transformation matrix (CTM). This matrix contains information related to translation, rotation and scaling. It is represented as a six-element array given by:

$$[a\ b\ c\ d\ t_x\ t_y]$$

The coordinate transformation from user space coordinate pair (x, y) to device coordinates (x', y') is given by the following equations.

$$x'=ax+cy+t_x$$

$$y'=bx+dy+t_y$$

In the case of shading operations, each device pixel coordinate needs to be transferred to the coordinate system, named as the shading space, that is used to define the shading operation, in order to compute the colour values corresponding to that particular device pixel. This coordinate mapping involves computing a shading space coordinate pair (x", y") for a given (x', y') using the shading transformation matrix $[a''\ b''\ c''\ d''\ t''_x\ t''_y]$, where its inverse matrix is given by, $$[a_i''\ b_i''\ c_i''\ d_i''\ t_{ix}''\ t_{iy}'']=[a''\ b''\ c''\ d''\ t''_x\ t''_y]^{-1}$$

and the correspondent mapping is defined as below:

$$x''=a_i''x'+c_i''y'+t_{ix}''$$

$$y''=b_i''x'+d_i''y'+t_{iy}''$$

In the case that a direct shading operation is invoked, such a shading space is the current user space. That is, for a pair (x", y"), x"=x, y"=y and $[a''\ b''\ c''\ d''\ t''_x\ t''_y]$=CTM; However, in the case that a shading operation is used with a Type 2 pattern dictionary, the shading space is the pattern coordinate system $(x_p, y_p)$ established at the time the shading pattern is instantiated with the PostScript operator makepattern. That means $x''=x_p$, $y''=y_p$ and $[a''\ b''\ c''\ d''\ t''_x\ t''_y]=[a_p\ b_p\ c_p\ d_p\ t_{px}\ t_{py}]$ (the compound pattern transformation matrix). Since each shaded device pixel needs to be mapped to the shading space to compute the corresponding pixel colour, shading operations are inherently computation intensive and thus inefficient.

Radial (Type 3) shading, as described by the Postscript Language reference manual, defines a colour blend that varies between two circles. They are commonly used to depict 3D spheres and cones. The blend circles are defined in terms of a subsidiary parametric variable, which varies linearly between 0.0 and 1.0. The parametric variable normally needs to be calculated first from a unique circle in shading coordinate space on that a particular point (x", y") resides. The resulting parametric variable is then used to compute the corresponding shading colour by use of a defined mathematical function in the Type 3 shading dictionary. When shading a device pixel, it is necessary to transform the device pixel to the shading coordinates, and identify the circle in which the mapped pixel resides. From the identified circle, the corresponding parametric variable can be found to determine the colour that should be painted on the current device pixel. Notice that the function dictionary is used in this type of shading operation. There are three types of function dictionaries supported in PostScript language level 3: the sampled function (Type 0), the exponential interpolation function (Type 2) and the stitching function (Type 3). These Function dictionaries are tightly associated with smooth shading operation, providing close control over the shape of the colour transitions across the geometry of the shading. The sampled function (Type 0) provides an approximation of any desired mathematical function based on a sequence of sampled values, using either linear or cubic interpolation as defined in the function dictionary. For a given function input, the surrounding nearest neighbor sample values of the input need to be located for performing any specified interpolation scheme.

Triangle meshes based (Types 4 and 5) shading, as described by the Postscript Language reference manual, defines the area to be shaded by a path composed entirely of triangles. The colour at each vertex of the triangle is specified, and a technique known as Gouraud interpolation is used to colour the interiors. The function dictionary is the optional entry of these types of shading dictionaries. When shading the device pixels, it is necessary to transform the device pixels to the shading coordinates and identify the location within the defined triangles in the shading space to determine the colours of the pixels to be painted.

Patch meshes based (Types 6 and 7) shading as described by the Postscript Language reference manual, defines the area to be shaded by a path composed entirely of patches bounded by four cubic Bezier curves. The colour at four intersection points of the boundary Bezier curves is specified, and two linear parameters (u,v) spanning 0.0 to 1.0 inclusive are used to interpolate the colour of interior of the patch. The interpolation is defined in the shading domain rather than in the device domain. The function dictionary is optional for these types of shading operation. When shading the device pixels, it needs to transform the device pixels to the shading coordinates and identify the location within the defined patches in the shading space to perform the corresponding colour interpolation.

In the above shading types, the necessity to transform the device coordinates to shading coordinates, simply to determine the colour at the device pixel is computationally expensive. Coordinate transformations also incur round-off errors when used with fixed-point arithmetic. In order to avoid such drawbacks, the colour computations should be performed in the device space.

SUMMARY OF INVENTION

The present invention provides a method of computing the parameter variable that is used to calculate the shading colour of a function dictionary that is specified in the shading dictionary, or computing the correspondent shading colour if no function dictionary is defined for a particular device pixel directly, using the device coordinate system. The shading mechanism defined by the shading dictionary is re-mapped from the shading coordinates to the device space using a plurality of parameters. These parameters are computed once per shading dictionary. Interpolation algorithms are performed on the device space to determine the colour to be painted.

In accordance with an aspect of the present invention, there is described a method of merging the shading transform matrix [a" b" c" d" t"$_x$ t"$_y$] with the radial shading equations of parametric circles, to produce a quadratic equation in terms of the parameter variable corresponding to the shading colour. The determinant of the quadratic equation indicates the existence of a defined colour if positive (or zero). The solution of the quadratic equation, within the interval 0.0 to 1.0 inclusive, represents the parameter variable corresponding to the shading colour.

A further aspect of this invention related to radial shading includes derivation of a plurality of parameters from the shading dictionary to rapidly compute the aforementioned determinant of the quadratic equation.

Another aspect of the present invention is related to radial shading that includes the systematic determination of the surrounding neighborhood for an input of the sampled function (Type 0), facilitating any underlying interpolation scheme (either linear or cubic spline interpolation) defined in the function dictionary for shading operations. Based on the assumption of the forwarding interpolation strategy is used for the implementation of all possible interpolation schemes required for shading operations, the number of the sample points in the surrounding neighborhood is computed. Accordingly, the index in the sample table and the position in the sequential DataSource of the nearest sample point—that is always referred as the left-bottom sample point of the surrounding neighborhood—is determined, based on the candidate index value in the sample table correspondent to the input. Subsequently, the index in the sample table and the position in sequential Datasource of the rest of the sample points in the surrounding neighborhood are calculated relative to the left-bottom point. The correspondent sample values of all surrounding neighbors of the input are retrieved. The information of the surrounding neighborhood is used for any underlying interpolation computation that might be involved in shading operation, such as in the shading Type 3 operation.

In accordance with another aspect of the present invention, there is described a method of performing triangle meshes based shading directly in the device domain. The vertices of the triangles defined by the shading dictionary are converted to device space once per triangle. Each mapped triangle is then shaded according to the sequence defined in the shading dictionary by applying Gouraud interpolation scheme in the device space. When a mapped triangle in the device space is in shading process, it is referred as the current triangle. In order to achieve a correct and fast shading colour computation, a pair of edges of the current triangle (in the device space)—that intersects the scanline on which the current device pixel resides—is accurately located in the left-to-right order. Subsequently, only the shading colour difference from previous shading colour (when the function dictionary does not present in the shading dictionary), or the difference from the previous value of the parametric variable (when the function dictionary presents) that is used to compute the correspondent shading colour, is calculated according to the increment in the device coordinate y' (once per scanline) and x' (per pixel), and then used to determine the correspondent shading colour of the device pixel.

In accordance with another aspect of the present invention, there is described a method of performing patch meshes based shading directly in the device domain. The control points of the patch defined by the shading dictionary and bounded by four cubic Bezier curves are converted to device domain once per patch. Each the mapped patch in the device space is then shaded according to the sequence defined in the shading dictionary, by mapping the four-sided device patch onto the unit square that has two parametric variable (u,v) respectively varied horizontally and vertically from 0.0 to 1.0 inclusive, applying multi-dimensional linear interpolation on the dvice Bezier curves to locate each surface point of the device-domain patch for (u,v) varying over the unit space and employing bi-linear interpolation algorithm in the unit space to compute the shading colour for the resulting device surface pixel at its correspondent parametric value (u, v). When a mapped patch in the device space is being shaded, it is referred as the current patch. The pair of C boundary curves (correspondent to the two horizontal sides of the unit space for v=0.0 and v=1.0) and the pair of the D boundary curves (correspondent to the two vertical sides of the unit space for u=0.0 and u=1.0) are correctly identified among the four Bezier boundary curves of the current patch before the patch is mapped onto its correspondent unit space. Implicit control points residing on the device space patch are computed for the shading Type 6 and are used, together with the twelve mapped control points of the boundary Bezier curves of the patch, to divide the C curves (correspondent to v varying vertically across the parametric space, i.e., the unit square) and the D curves (correspondent to the u varying horizontally across the unit square) into a plurality of subsections. Whereas for shading Type 7, its four mapped internal control points in the device space are used directly, together with the twelve mapped boundary control points of the mapped patch, to derive such a plurality of subsections of the C and D curves within the device-domain patch. As a result, the u and v domain of 0.0 to 1.0 is subdivided into number of steps that equals to the product of a experimental factor (misPT=1.3) and the number of device curve pixels on the longest C device-domain control curve among the device-domain boundary C curves and the device-domain horizontal control curves defined by the device implicit (for shading Type 6) or internal (for shading Type 7) control points in horizontal direction, but in vertical direction is equivalent to the number of device curve pixel of the longest control D device-domain curve among the device-domain D curves and the device domain vertical control curves defined by the device implicit (for shading Type 6) or internal (for shading Type 7) control points in the vertical direction. Accordingly, the number of steps in the u and v domain of 0.0 to 1.0 is equivalent to the number of subsection of the C and D curves of the mapped patch respectively. The length of each subdivided Bezier curve of the mapped patch is approximated in the device space using the linear subsection with antialias consideration. Therefore, any device pixel within the specified shading patch can be directly attributed to the corresponding u and v values, enabling the direct computation of shading colour.

A further aspect of this invention related to the patch mesh based shading includes the patch fold-over handling. When a patch appears to fold-over on itself, the cubic Bezier curves (the C curves or D curves) on the patch can be intersecting or self-intersecting. That means the location of the pixels on the device space Bezier curve may change direction so that pixels are mapped onto previously mapping pixels as the value of u or v increases in the parametric space. For the case that more than one parametric space location (u, v) is mapped to the same device pixel, only the shading colour correspondent to the largest value of u will be chosen to paint the device pixel if these parametric coordinates have the same value of v; Otherwise, only the shading colour correspondent to the largest value of v will be used. In the related invention, each device-domain patch is painted with the solid device white colour first, except from the shading operation whose Background colour is not defined and that is under the process of caching the shading bitmap (where the initialization of the bitmap mask is equivalent to painting the patch white). After that, the patch is shaded as the parametric variables (u, v) varying from 1.0 to 0.0, instead of from 0.0. to 1.0, across the unit square. For each device-domain curve subsection, the end point of the curve subsection is traced as the last shading point to prevent from any duplicated mapping onto the previous mapped device pixel, ensuring one-to-one mapping between the parametric space (u, v) to the device space. Also, within each device-domain curve subsection, each device curve pixel is then painted with the shading colour only if the current colour of the pixel is white in the device domain, achieving correct one-to-one mapping between the unit space and the device patch.

Still other aspects of the present invention will become readily apparent to those skilled in this art from the following description, wherein there is shown and described a preferred embodiment of this invention, simply by way of illustration of one of the best modes suited for to carry out the invention. As it will be realised, the invention is capable of other different embodiments and its several details are capable of modifications in various obvious aspects all without departing from the invention. Accordingly, the drawing and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description serve to explain the principles of the invention.

FIG. 6 is a block diagram of a methodology for performing image shading accordance with an aspect of the present invention.

FIG. 7 is a block diagram of a methodology for performing radial shading in accordance with an aspect of the present invention.

DETAILED DESCRIPTION OF THE PREFERRED EMBODIMENT

Figure 1:
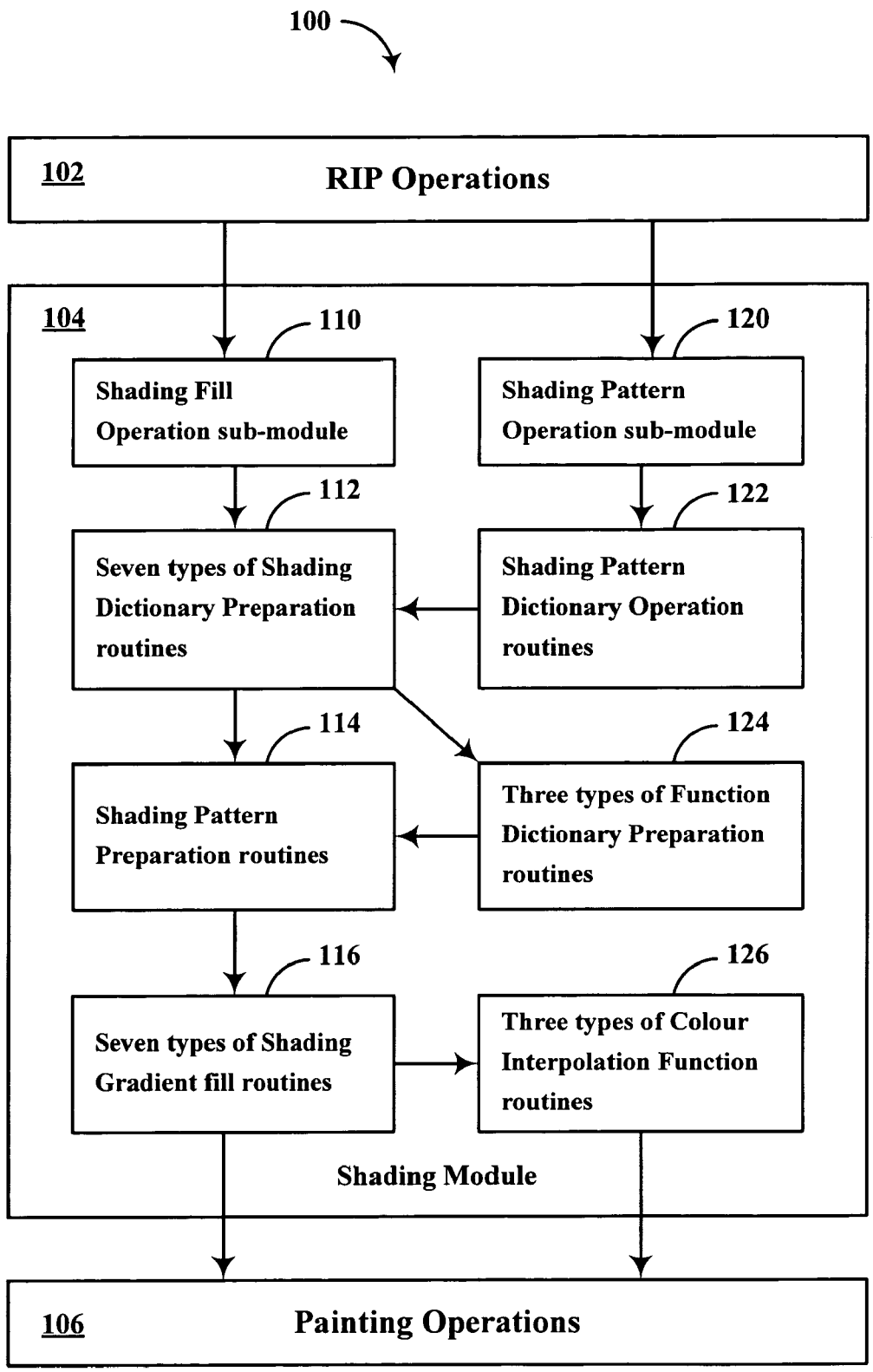
FIG. 1 is a block diagram of shading module.

Referring to FIG. 1, in a raster graphics output device such as a printer or a display, the rasterisation of input visual information is performed via a raster image processor 102 contained within a control unit 100 of the device. Shading operations required for rasterisation of input data is usually performed within a shading module 104. Such a module contains predominantly two sub-modules, one for performing shading operation on areas bounded by simple geometric shapes and another for accomplishing shading pattern rendering operations on coverage areas with complicated geometrical boundaries. When painting a defined area with a shading pattern, a pattern dictionary is normally used, that describes the pattern type, unique identification number for identifying the particular pattern, Implementation key for specifying any implementation-dependent entries that are associated with the pattern and a shading definition, i.e., a shading dictionary. There are seven types of shading dictionaries specified in PostScript language level 3. Each type of shading dictionary can contain one of three types of function dictionaries for shading Types 1, 2 and 3, and optionally for shading Types 4, 5, 6 and 7 to define how the shading colour or colours vary across the area to be shaded.

After the image rendering job is processed by the raster image processor 102, it is input into shading module 104.

The shading rendering operation instructions together with relevant parameters from raster image processor 102 is input into both the Shading Fill Operation sub-module 110, which is used for performing shading operations on areas bounded by simple geometric shapes, and the Shading Pattern Operation 120 sub-module which is used for accomplishing shading pattern rendering operations on coverage areas with complicated geometrical boundaries. The Shading Pattern Operation sub-module 120 then sends its parameters, i.e., the Type 2 pattern dictionary, to the Shading Pattern Dictionary Operation routines 122. The Shading Fill Operation sub-module 110 accepts the shading dictionary as the input argument data of the sub-module. The Seven types of Shading Dictionary Preparation routines 112 then receive input (i.e., the shading dictionary) from both the Shading Fill Operation sub-module 110 and the Shading Pattern Dictionary Operation routines 122. The Seven types of Shading Dictionary preparation routines 112 then sends data to the Shading Pattern Preparation routines 114, and the Three types of Function Dictionary Preparation routines 124 if the function dictionary presents in the shading dictionary. The Three types of Function Dictionary Preparation routines 124 subsequently forwards the data to the Shading Pattern Preparation routines 114. Data from Shading Pattern Preparation routines 114 is then input to the Seven types of Shading Gradient Fill routines 116. Data from the Seven types of Shading fill routines is sent to Three types of Colour Interpolation Function routines 126, as well as to Painting Operations 106, if the function dictionary is defined. In addition, data from Three types of Colour Interpolation Function routines 126 is sent to Painting Operations 106. Although, there are Seven Types of Shading Preparation routines 112, Three types of Function Dictionary Preparation routines 122 and Three Types of Colour Interpolation 126 Function routines and Seven types of Shading Gradient fill routines 126 shown in FIG. 1 corresponding to the number of shading types, function types and colour interpolation routines currently defined by Postscript, the number of routines may be varied to any suitable value to correspond to the implementation for control unit 100. An aspect of the present invention is directed to techniques for shading gradient fill routines to be employed by the Seven types of Shading Gradient fill routines 116.

Table 1 below illustrates the general contents of a shading dictionary.

TABLE 1

General contents of a shading dictionary

| KEY | TYPE | VALUE |
| --- | --- | --- |
| ShadingType (Required) | Integer | 1- Function-based shading<br>2- Axial shading<br>3- Radial shading<br>4- Free-form Gouraud-shaded triangle mesh<br>5- Lattice-form Gouraud-shaded triangle mesh<br>6- Coons patch mesh<br>7- Tensor-product patch mesh |
| ColourSpace (Required) | Name or Array | The colour space in which shading colour values are expressed. May be any device, CIE-based, or special colour space except a Pattern space. |
| Backgorund (Optional) | Array | An array of colour components corresponding to the colour space, specifying a single background colour value. |
| BBox (Optional) | Array | An array of four numbers giving the left, bottom, right and top coordinates respectively, of the shading bounding box. |

TABLE 1-continued

General contents of a shading dictionary

| KEY | TYPE | VALUE |
| --- | --- | --- |
| Anti Alias (Optional) | Boolean | A flag indicating whether to filter the shading function to prevent aliasing artifacts. |

The information contained within a shading dictionary is essential for performing shading operations either as a shading pattern or as a colour filling of a specified geometric boundary. According to the Postscript Language Reference Manual, the contents of a shading dictionary are described as shown in Table 1. Depending on the type of shading, further information specific to each shading mechanism is included in each shading dictionary.

Referring to FIG. 6, there is shown a method 600 for computing the shading colour (if no function dictionary is specified) or the value of a parameter variable (if the function dictionary is defined in the shading dictionary) corresponding to the shading colour for a particular device pixel directly, using the device coordinate system. At 602, the shading mechanism defined by the shading dictionary is re-mapped from the shading coordinates to the device space using a plurality of parameters. These parameters are computed once per shading dictionary. For example, the shading mechanism can be a specified closed surface in a shading domain. Additionally, colours for points located along the perimeter of the closed surface in the shading domain can be defined, thus when the closed surface is mapped from the shading domain to a device domain, forming a device domain closed surface, the colours corresponding to the points located along the perimeter of the closed surface are also mapped into the device domain. As shown at 604, interpolation algorithms for points bounded by the closed surface are performed in the device space to determine the shading colour to be painted.

Radial (Type 3) shading defines a colour blend that varies between two circles. They are commonly used to depict 3D spheres and cones. In addition to the dictionary entries in Table 1, Type 3 shading dictionary contains the entries shown in Table 2.

TABLE 2

Additional entries in a type 3 shading dictionary

| KEY | TYPE | VALUE |
| --- | --- | --- |
| Coords (Required) | Array | An array of six numbers$^{[x_0,y_0,r_0,x_1,y_1,r_1]}$ specifying the centres and radii of the starting and ending circles, expressed in the shading coordinate space |
| Domain (Optional) | Array | Array of two numbers$^{[t_0,t_1]}$ specifying the limiting values of a parametric variable t, which is considered to vary linearly between these two values, as the colour gradient varies between the starting and ending circles. |
| Function (Required) | Dictionary or Array | A 1-in n-out function dictionary or an array of n 1-in, 1-out function dictionaries, where n is the number of colour components as defined by the colour space. Entries represent colour values corresponding to values of parameter t. |
| Extend (Optional) | Array | An array of two boolean values specifying whether to extend the shading beyond the starting and ending circles. |

Figure 2:
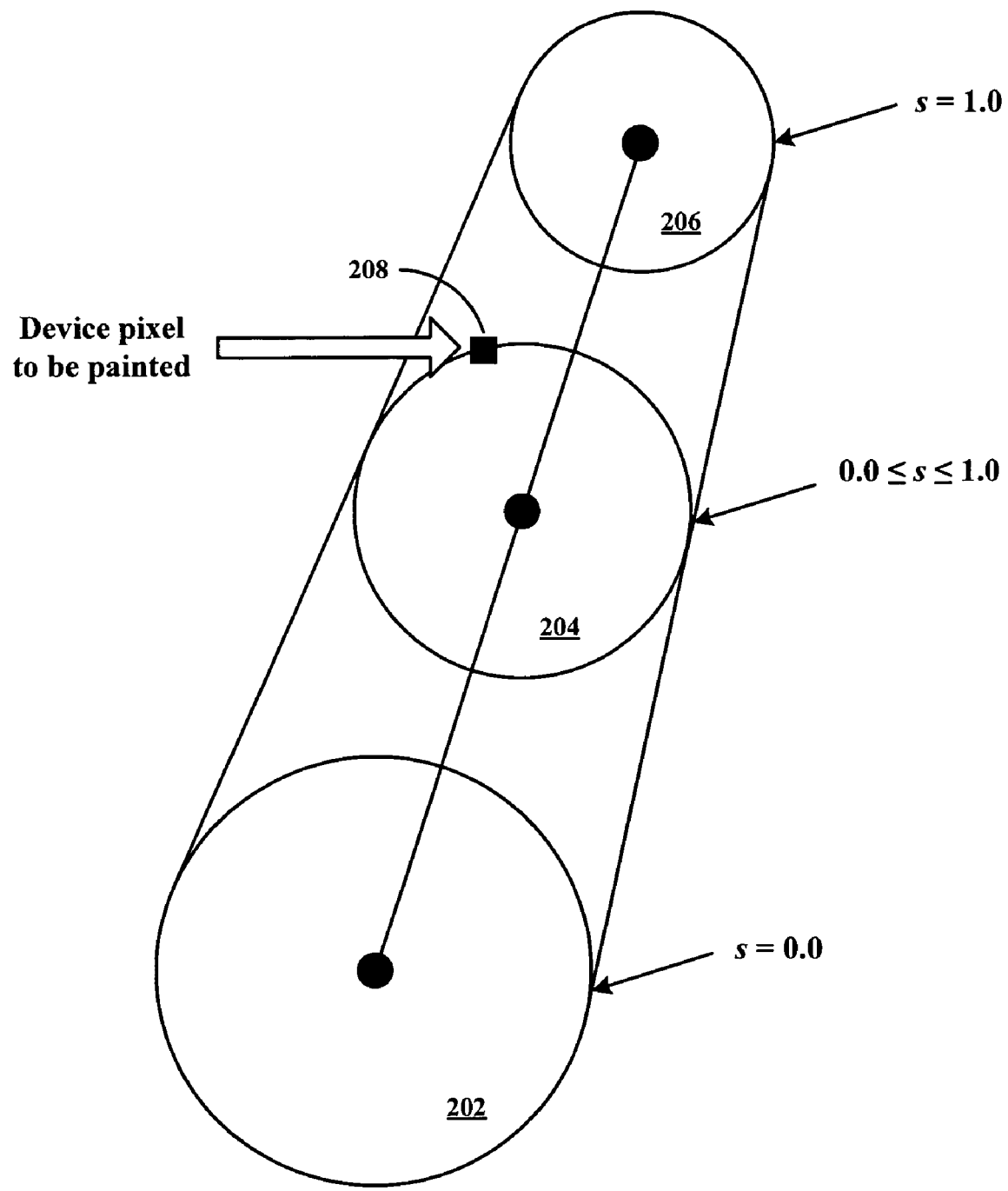
FIG. 2 is an illustration of radial shading in device space.

The blend circles for shading are defined in terms of a subsidiary parametric variable, s, given by:

$$s = \frac{t - t_0}{t_1 - t_0}$$

Where s varies between 0.0 and 1.0 inclusive, as the variable t varies between $t_0$ to $t_1$, for shading circles between the starting and ending circles, as shown in FIG. 2. As illustrated in FIG. 2, the starting circle 202 is for the case when s=0.0 (as t=$t_0$) and the ending circle 206 is for the case where s=1.0 (as t=$t_1$). Circle 204 illustrates when s is greater than or equal to 0.0 and less than or equal to 1.0. The device pixel to be pained 208 is located on circle 204.

The centre [$x''_c(s)$, $y''_c(s)$] and radius [$r''(s)$] of each blend circle in the shading space can be represented as follows:

$$x''_c(s) = x''_0 + s \times (x''_1 - x''_0)$$

$$y''_c(s) = y''_0 + s \times (y''_1 - y''_0)$$

$$r''(s) = r''_0 + s \times (r''_1 - r''_0)$$

However, when rendering a shaded area in the device space, the rendering operations are performed one raster scanline at a time. Therefore, usually, it is necessary to map a particular pixel within a given raster line into the shading coordinate space using the inverse of the shading transformation matrix [a" b" c" d" $t''_x$ $t''_y$], to identify the shading circle on that the mapped pixel resides. Hence determining the value of corresponding s, and the parameter variable t, which produces the colour to be painted with the help of the entry of the function dictionary defined in this type of shading dictionary?

However, according to an aspect of the present invention, it is possible to compute the corresponding s value directly for a given device pixel. Referring to FIG. 7, with continued reference to FIG. 2, the process 700 involves, as shown at 702, combining the shading transformation matrix [a" b" c" d" $t''_x$ $t''_y$] with the blend circle equations to derive a quadratic equation in terms of the variable s, as shown below:

$$As^2 + Bs + C0 \text{ Where,}$$

$$A = P0$$

$$B = dx' \times P1 + dy' \times P2 + P3$$

$$C = dx' \times dx' \times P5 + dy' \times dy' \times P6 + dx' \times dy' \times P7 + P4$$

In which, dx'=x'-$x'_0$ and dy'=y'-$y'_0$, where (x', y') is the current device pixel coordinates that needs to be painted and ($x'_0$, $y'_0$) represents the centre coordinates of the starting circle in the device domain. The constants P0 to P8 are computed as shown below:

$$P0 = (x''_1 - x''_0) \times (x''_1 - x_0) + (y''_1 - y''_0) \times (y''_1 - y''_0) - (r''_1 - r''_0) \times (r''_1 - r''_0)$$

$$P1 = 2 \times [d'' \times (x''_1 - x''_0) - b'' \times (y''_1 - y''_0)]/P8$$

$$P2 = -2 \times [a'' \times (y''_1 - y''_0) - c'' \times (x''_1 - x''_0)]/P8$$

$$P3 = -2 \times [r''_0 \times (r''_1 - r''_0)]$$

$$P4 = -(r''_1 - r''_0)$$

$$P5 = (d'' \times d'' + b'' \times b'')/(P8 \times P8)$$

$$P6 = (c'' \times c'' + a'' \times a'')/(P8 \times P8)$$

$$P7 = -2 \times (c'' \times d'' + a'' \times b'')/(P8 \times P8)$$

$$P8 = a'' \times d'' - b'' \times c''$$

It should be noted that all constants P0 to P8 and ($x'_0$, $y'_0$) should be computed only once per each shading dictionary, thus as shown at 704 constants P0 to P8 are stored, which reduces the computation that should be performed per each rendering pixel. Therefore, per pixel computations are limited to computing dx' and dy' values.

At 706, the determinant of the above quadratic equation is computed. The determinant ($\Delta$) of the above quadratic equation is given by:

$$\Delta = B \times B - 4 \times A \times C$$

If $\Delta$ is negative, the device pixel is outside the blending circle domain and need not be painted. Otherwise, a solution to the quadratic equation exists, and is given by:

$$s = (-B \pm \sqrt{\Delta})/(2 \times A),$$

which is computed at 708.

The solution within $0.0 \leq s \leq 1.0$ interval is considered as the valid solution for s. The corresponding parameter t is then simply computed at 710 using the equation below, $$t = t_0 + s \times (t_1 - t_0)$$

Therefore, using the resulting t value and the function dictionary contained within the shading dictionary, it is possible to determine the shading colour for the device pixel (x', y') directly, without involving coordinate space transformations per each pixel. Hence, this method is faster in rendering plurality of shaded device pixels compared to the methods known by prior art.

The function dictionary is employed by Radial (Type 3) shading, as indicated in Table 2, for performing the shading colour computation respect to the parametric variable t. The function dictionary used here specifies the colour function's representation, the set of attributes that parameterize that representation and the additional data needed by that representation. Three types of function dictionary are supported in the PostScript language level 3. The function dictionaries are solely used by smooth shading dictionary to provide close control over the shape of the colour transitions across the geometry of the shading. All types of function dictionary share the keys listed in Table 3.

TABLE 3

General contents of a function dictionary

| KEY | TYPE | VALUE |
| --- | --- | --- |
| FunctionType (Required) | Integer | 0- Sampled function<br>2- Exponential interpolation function<br>3- Stitching function |
| Domain (Required) | Array | An array of 2 × m numbers for clipping input values, where m is the number of input values. |
| Range (required for Type 0, Optional for others) | Array | An array of 2 × n numbers for clipping input values, where n is the number of output values. |

For shading operations, the parameter m=2 for shading Type 1 or 1 for others; n=1 or the number of colour components defined in shading dictionary. Moreover, each type of function dictionary must include attributes appropriate to the particular function type.

Sampled (Type 0) function uses a sequence of sample values to approximate any described mathematic function whose input domain and output range are bounded. This type of function is the most general type of function. In addition to the entries in table 3, the Type 0 function includes the entries listed in Table 4.

TABLE 4

Additional entries in a Type 0 function dictionary

| KEY | TYPE | VALUE |
|---|---|---|
| Order (Optional) | Integer | The order of interpolation between samples.<br>1 - linear interpolation<br>3 - cubic spline interpolation |
| DataSource (Required) | String or file | A string or positional file providing the sequence of sample values that specifies the function. |
| BitPerSample (Required) | Interger | The number of bits used to represent each component of each sample value. The number must be 1, 2, 4, 8, 12, 16, 24 or 32. |
| Encode (Optional) | Array | An array of 2 × m numbers specifying the liner mapping of input values into the domain of the function's sample table. |
| Decode (Optional) | Array | An array of 2 × n numbers specifying the liner mapping of sample values into the range of the values appropriate for the function's output values. |
| Size (Optional) | Array | An array of m positive integers specifying the number of samples in each input dimension of the sample table. |

The sample values used by the Type 0 function are usually organized as an m-dimensional table in which each entry has n components. The output values of the function is calculated based on the sample table, using the required interpolation scheme (i.e., either the liner interpolation or cubic spline interpolation scheme). As mentioned before, for shading operation, the input dimension of a function dictionary could be 2 for shading Type 1, or 1 for others. Therefore, the 1-D linear interpolation, 2-D linear interpolation, 1-D cubic spline interpolation or 2-D cubic spline interpolation scheme could be involved to compute shading colour(s) for shading operation. In order to perform any these possible interpolation scheme for an input value of the function Type 0 dictionary, the nearest surrounding sample values of the input need to be located in the sample table of the function dictionary. Such determination is usually accomplished using different mechanisms suitable to different underlying interpolation scheme respectively, because the number of surrounding sample values and their position relative to the input value in the sample table are different. However, in the described invention, a systematic mechanism for determining the surrounding neighborhood in the sample table for an input of Type 0 function dictionary is provided under the assumption of the forwarding interpolation strategy is applied, facilitating any above mentioned types of interpolation scheme that might be involved in shading operations.

Figure 11:
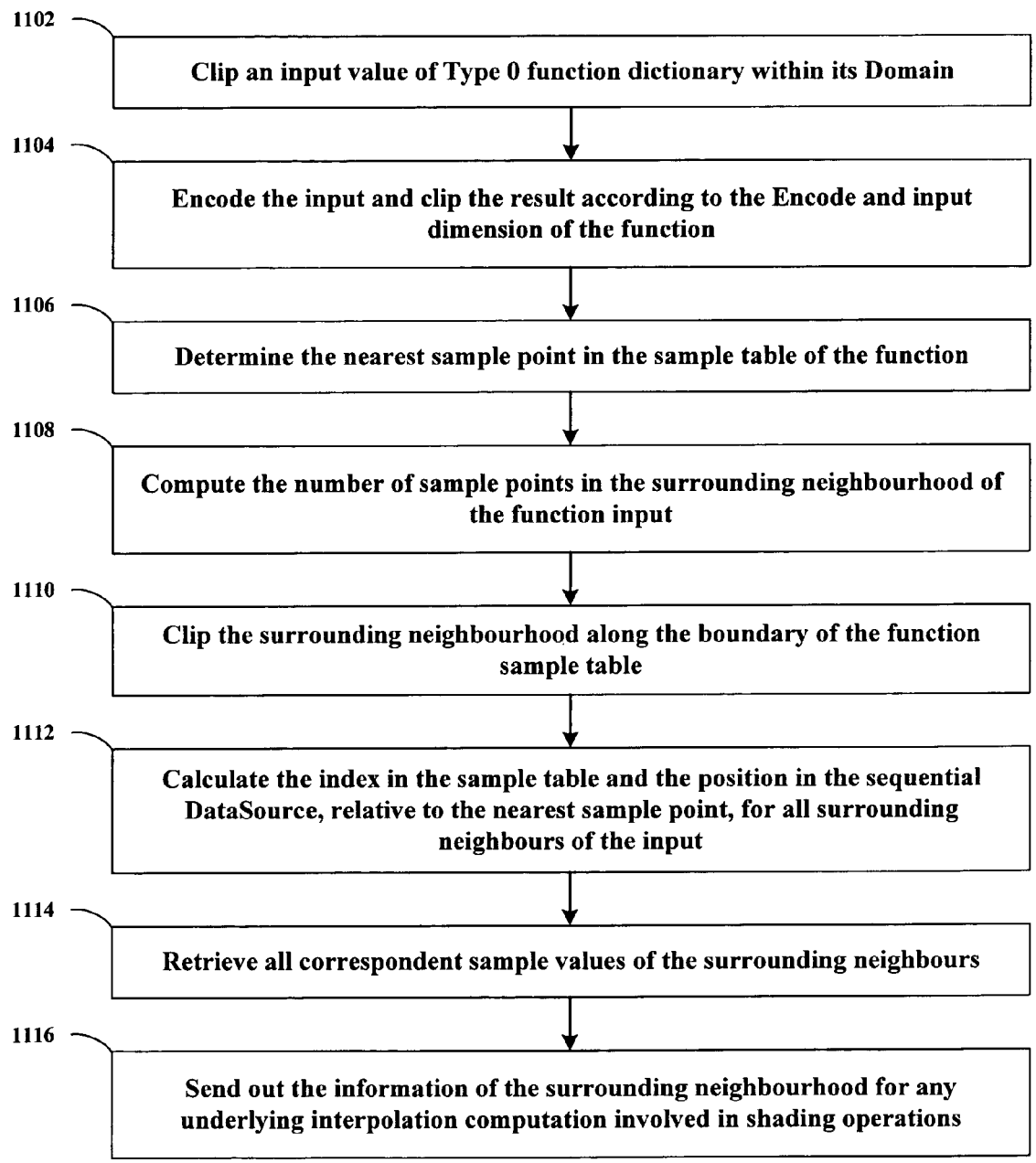
FIG. 11 is a block diagram of a systematic mechanism for determining the surrounding neighbourhood of a given input of Type 0 function dictionary for shading operations in accordance with an aspect of the present invention.

Under the forwarding interpolation strategy, the surrounding neighborhood in sample value table for an input of Type 0 function dictionary can be depicted as shown in FIG. 10, for the above mentioned four types of interpolation schemes that might be defined in the function dictionary for shading operations. Referring to FIG. 11, with continued reference to FIG. 10, given an input of Type 0 function dictionary, at 1102 the input is clipped within the Domain of the function, and at 1102 encoded using the Encode definition of the function and clipped according to the input dimension specified in the Size entry of the function. The result is used as the candidate input of the sample table of the function. According to the candidate, at 1106 the index (Idxlb) of the nearest sample point in the sample table is determined, that is always treated as the left-bottom point of the surrounding neighborhood of the given input as shown in FIG. 11. Subsequently, at 1108 the number of sample value in the surrounding neighborhood in sample table is computed as below:

For Order=1 or $Size_i<4$ (i=1, ..., m), the number of sample values in the surrounding neighborhood=C×P, where the parameter C=2 and P=m;

For Order=3 or all $Size_i \geq 4$ (i=1, ..., m), the number of sample values in the surrounding neighborhood=C×p, where C=3 and P=2×m−1;

Notice that the forwarding interpolation strategy is applied. At 1110, the determined index in the sample table of the nearest sample point is then examined in order to clip the surrounding neighborhood around boundary of sample table as shown below:

If $Idxlb_i \geq Size_i - C+1$ then $Idxlb_i = Idxlb_i - 1$; where i= 1, ..., m.

Subsequently, at 1112 the index of the other sample points of the surrounding neighborhood in the sample table, as well as the position in the sequential DataSource of all surrounding neighborhood points are computed relative to the nearest sample point. At 1114, the correspondent sample values of the surrounding neighborhood are retrieved. At 1116, all the information about the surrounding neighborhood of the input is sent to the underlying interpolation scheme specified in the function dictionary, to calculate the correspondent output function value, e.g., the shading colour in shading Type 3 operations. It should be noted that the number of sample points in the surrounding neighborhood is calculated once for the sampled (Type 0) function used by shading operations.

Triangle mesh based shading is commonly used to paint complex coloured and shaded 3D shapes. The area to be shaded is defined by a path composed entirely of triangles. The shading dictionary DataSource entry specifies the colour at each vertex of the triangles.

Figure 3:
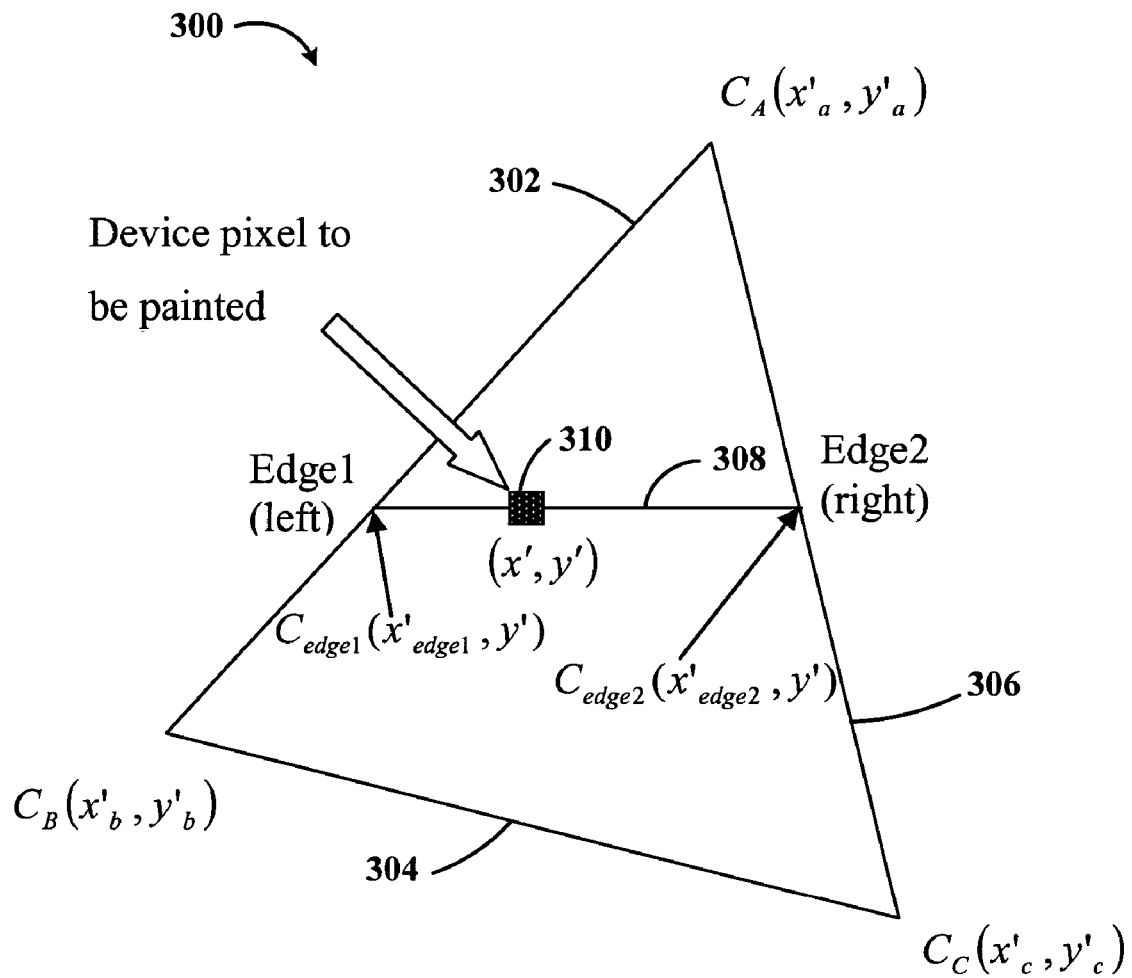
FIG. 3 is an illustration of triangle mesh based shading in device space.
Figure 8:
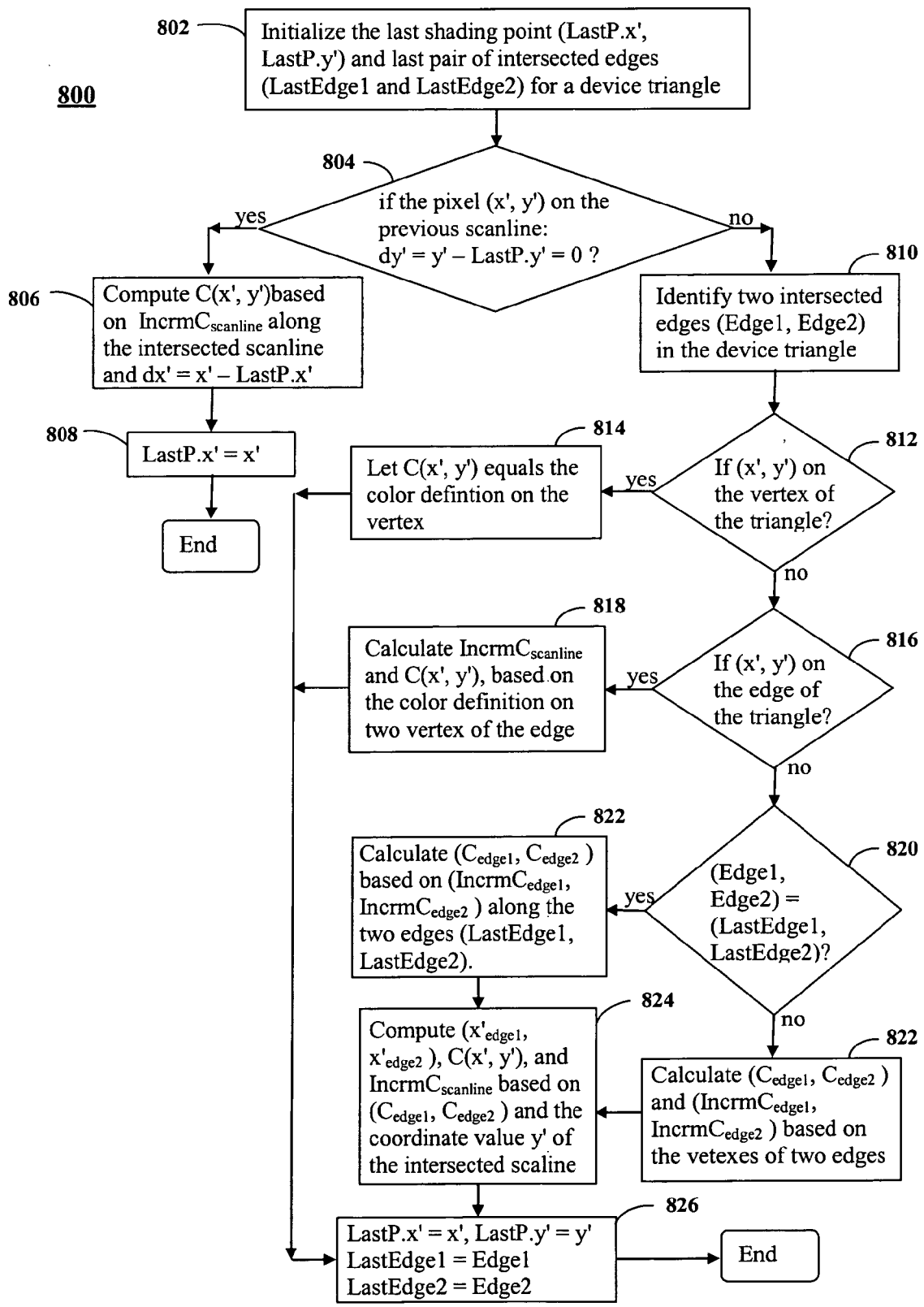
FIG. 8 is a block diagram of a methodology for performing triangular mesh shading in accordance with an aspect of the present invention.

According to the present invention, each triangle 300 defined by the given vertex coordinates, $C_A(x''_a, y''_a)$, $C_B(x''_b, y''_b)$, $C_C(x''_c, y''_c)$ in the shading space as illustrated in FIG. 3, are mapped to the device domain coordinates $C_A(x'_a, y'_a)$, $C_B(x'_b, y'_b)$, $C_C(x'_c, y'_c)$ from the shading space. A closed path is constructed in the device domain by connecting the vertices via lines 302, 304 and 306. As shown in FIG. 3, the colour of any device pixel 310 within the constructed closed path, that needs to be painted is directly computed in the device domain. The raster scanline 308 in which the device pixel resides is identified by its y-coordinate. The two edges Edge1, Edge2, where this scanline meets the constructed device-domain triangular path are determined correctly in the left-to-right order. For the instance shown in FIG. 3, the colour at device coordinates (x', y') is computed using a method 800 as described in FIG. 8 as follows:

Step 1 at 802:
Initialize the last shading point and last pair of intersected edges for a device triangle, for example: LastP.x'=−1, LastP.y'=−1, LastEdge1=−1 and LastEdge2=−1. At 804 it is determined if the pixel (x',y') is on the previous scanline.

If at 804, if $dy'=y'-LastP.y'=0$ (yes);

then at 806 C(x',y') is computed along the intersected scanline as $$dx'=x'-LastP.x', LastC+=dx'\times IncrmC_{scanline};$$

and at 808 LastP.x'=x' and return C(x', y')=LastC;
However, if at 804 dy'=y'−LastP.y' does not equal 0 (no), then at 810 for dy'>0, identify the left Edge1 and right Edge2 among three triangle edges; If at 812 the pixel (x', y')=(x'$_a$, y'$_a$), (x'$_b$, y'$_b$) or (x'$_c$, y'$_c$), (yes) return the correspondent vertex colour $C_A$, $C_B$, or $C_C$ as shown at 814; otherwise (no), at 816 if the Edge1=Edge2, the pixel line is on one of the edges of the triangle (yes), then at 818
$C_{edge1}$=the colour of the left vertex of the edge,
x'$_{edge1}$=the x-coordinator of the left vertex of the edge,
$C_{edge2}$=the colour of the right vertex of the edge,
x'$_{edge2}$=the x-coordinator of the right vertex of the edge, $$ddx'=x'_{edge2}-x'_{edge1}, IncrmC_{scanline}=(C_{edge2}-C_{edge1})/ddx' \text{ and}$$

$$LastC=[C_{edge1}\times(x'_{edge2}-x')+C_{edge2}\times(x'-x'_{edge1})]/ddx';$$

return C(x', y')=LastC; otherwise (no),
at 820, If Edge1=LastEdge1 and Edge2=LastEdge2 (yes) then at 822, $$C_{edge1}+=dy'\times IncrmC_{edge1} \text{ and } C_{edge2}+=dy'\times IncrmC_{edge2}; \text{ otherwise (no)}$$

at 812 for Edge1≠LastEdge1 or Edge2≠LastEdge2, $$ddy'_{left}=y'_a-y'_b, IncrmC_{edge1}=(C_a-C_b)/ddy'_{left}, \text{ and}$$

$$C_{edge1}=[C_a\times(y'-y'_b)+C_b\times(y'_a-y')]/ddy'_{left},$$

$$ddy'_{right}=y'_a-y'_c, IncrmC_{edge2}=(C_a-C_c)/ddy'_{right}, \text{ and}$$

$$C_{edge2}=[C_a\times(y'-y'_c)+C_c\times(y'_a-y')]/ddy'_{right}.$$

At 824:

$$x'_{edge1}=x'_a+(x'_b-x'_a)\times(y'-y'_a)/(y'_b-y'_a),$$

$$x'_{edge2}=x'_a+(x'_c-x'_a)\times(y'-y'_a)/(y'_c-y'_a),$$

$$ddx'=x'_{edge2}-x'_{edge1}, IncrmC_{scaline}=(C_{edge2}-C_{edge1})/ddx'.$$

At 826:

$$LastC=[C_{edge1}\times(x'_{edge2}-x')+C_{edge2}\times(x'-x'_{edge1})]/ddx',$$

LastP.x'=x', LastP.y'=y', LastEdge1=Edge1 and LastEdge2=Edge2;

return C(x', y')=LastC; End;

Where colour represented at the scanline intersection points with the triangular path edges are given by $C_{edge1}$ and $C_{edge2}$, the x-coordinates of the intersection points are given by x'$_{edge1}$ and x'$_{edge1}$, C(x',y') represents the shading colour or the parametric value cooresspondent to the shading colour at device coordinates (x',y'). The varible IncrmC$_{scanline}$ represents the constant increment in the colour or the parametric value along the scanline, whereas IncrmC$_{edge1}$ and IncrmC$_{edge2}$ for the increment in the colour or parametric value along the left Edge1 and the right Edge2 respectively. Step 802 is executed only once per device triangle. Also, for a particular device scanline, the y-coordinate remains unchanged. Therefore, only the steps 806 and 808 are repeated for every pixel on the scanline, where dx'=1. The results from steps 812, 816, 820 and 822 remains unchanged, and do not need re-computing along each scanline. As indicated at 820, when the intersected scanline moves along the same pair of the intersected edges of the device triangle, only the constant increment in the colour or the parametric value, i.e., IncrmC$_{edge1}$ and IncrmC$_{edge2}$, are used for calculating $C_{edge1}$ and $C_{edge2}$. It should be noted that the value of dy'=y'−LastP.y' always is 1 for the device-domain triangle and the constant increments IncrmC$_{edge1}$ and IncrmC$_{edge2}$ are only calculated once per pair of intersected edges.

Figure 4:
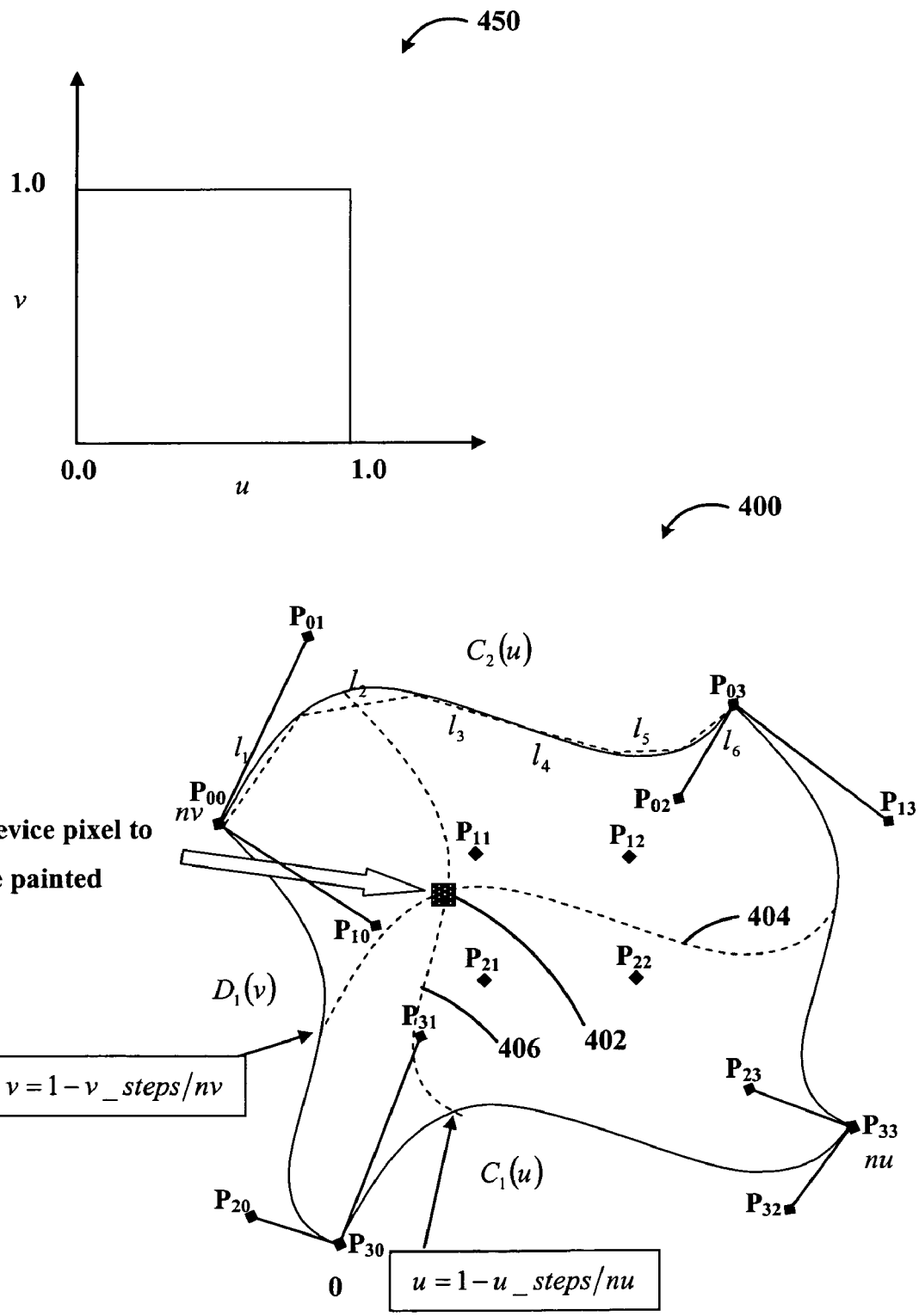
FIG. 4 is an illustration of patch mesh based shading in device space.

Referring to FIG. 4, there is illustrated an exemplary shading area 400 to be shaded using patch mesh based shading bounded by four cubic Bezier curves $C_1$, $C_2$, $D_1$, $D_2$. The boundary C curves, $C_1$, $C_2$, and the boundary D curves, $D_1$, $D_2$, are correspondent to the two horizontal sides of the unit square for u=0.0 and 1.0 and the two vertical sides of the unit square for v=0.0 and 1.0 respectively. As illustrated by graph 450, parametric variables u and v vary between 0.0 and 1.0. The device pixel to be painted 402 can be represented by a point at the intersection of curves 404 and 406. The curve 404 is parallel and between curves $C_1$, $C_2$, and the curve 406 is parallel and lies between curves, $D_1$, $D_2$. Such curves 404 and 406 are then referred as the C and D curves of the patch corresponding to the parametric variable u and v varying horizontally and vertically across the unit square respectively.

Patch mesh based shading is commonly used for graphical special effects. The shading area is constructed using a plurality of colour patches, each bounded by four cubic Bezier curves, $C_1$, $C_2$, $D_1$, $D_2$ as shown in FIG. 4. The C curves and D curves are defined over parametric variable u and v respectively. Colours are specified for each of the four-corners of the patch. The coordinate mapping for the shading is usually given by the surface S defined as below, For shading Type 6

$$S=(1-v)\times C_1(u)+v\times C_2(u)+(1-u)\times D_1(v)+u\times D_2(v)-(1-v)\times[(1-u)\times C_1(0)+u\times C_1(1)]-v\times[(1-u)\times C_2(0)+u\times C_2(1)]$$

For shading Type 7

$$S = \sum_{i=0}^{3}\sum_{j=0}^{3} P_{ij}\times B_i(u)\times B_j(v)$$

where $P_{ij}$ is the control point in row i and column j of the patch, $B_i$ and $B_j$ are Bernstein polyniminals $$B_0(t)=(1-t)^3$$

$$B_1(t)=3\times t\times(1-t)^2$$

$$B_2(t)=3\times t^2\times(1-t)$$

$$B_3(t)=t^3$$

It should be noted that the four control points ($P_{11}$, $P_{12}$, $P_{21}$, $P_{22}$) are implicitly defined by the boundary curves of the patch in shading Type 6 and given by equations:

$P_{11} = S(1/3, 2/3)$ $P_{12} = S(2/3, 2/3)$ $P_{21} = S(1/3, 1/3)$ $P_{22} = S(2/3, 1/3)$

Where S is the surface over the patch of shading Type 6. The four control points is hence called implicit control points in Shading Type 6. Furthermore, the span of the parametric variable u and v is limited to 0.0 to 1.0 inclusive for both shading Type 6 and Type 7.

Figure 9:
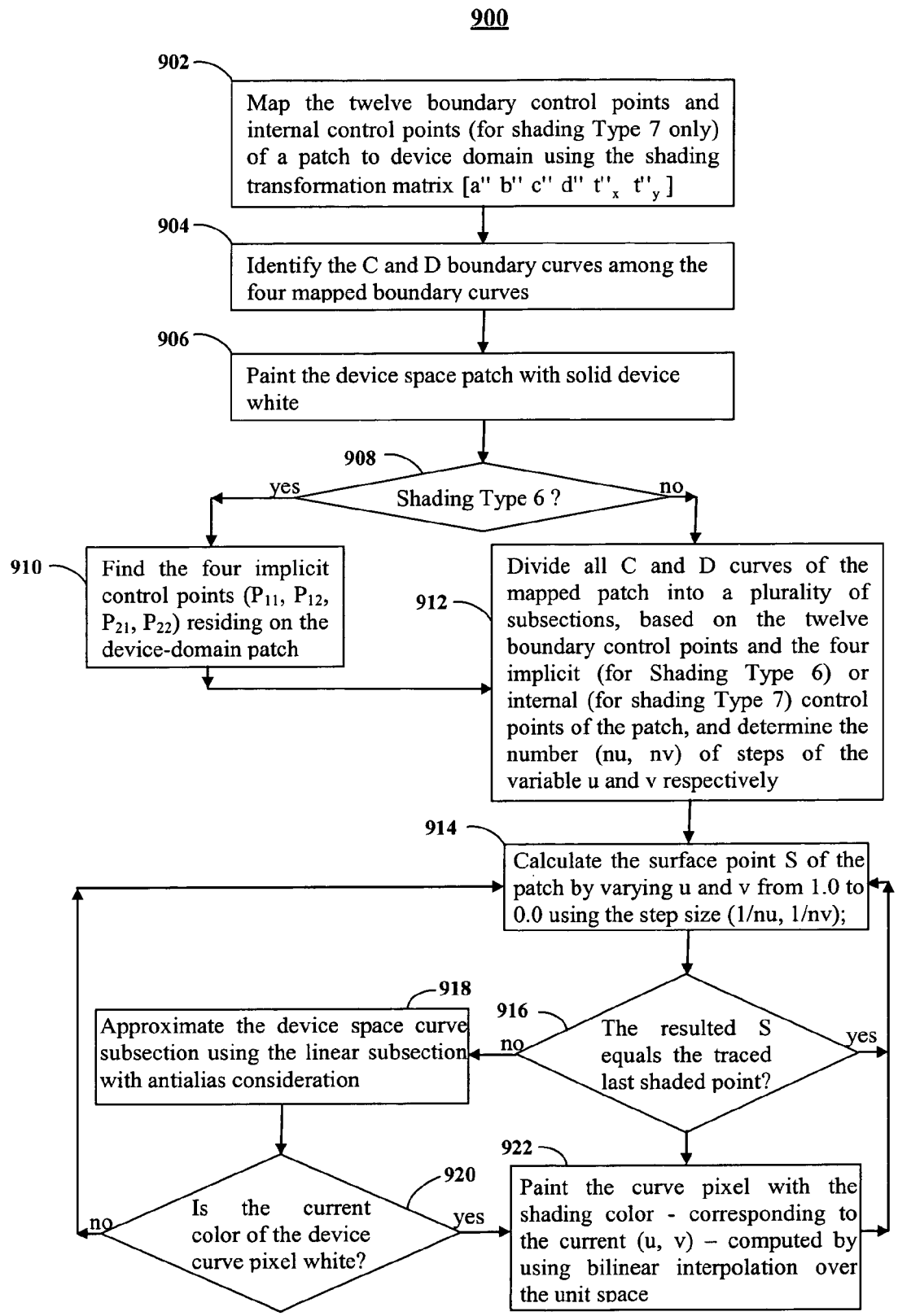
FIG. 9 is a block diagram of a methodology for performing patch meshes shading in accordance with an aspect of the present invention.
Figure 10A:
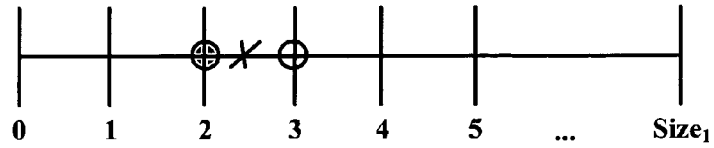
FIG. 10 an illustration of the surrounding neighbourhood for an input of Type 0 function dictionary (under the forwarding interpolation strategy) used by four types of underlying interpolation scheme that might be involved in shading operations.
Figure 10B:
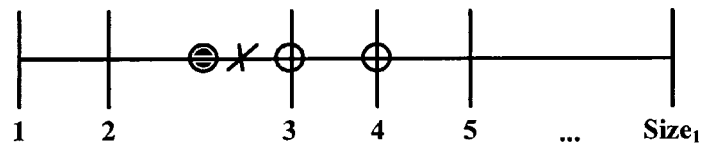
Figure 10C:
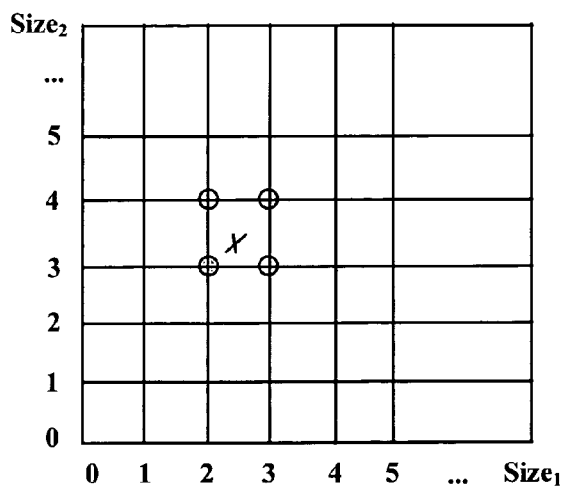
Figure 10D:
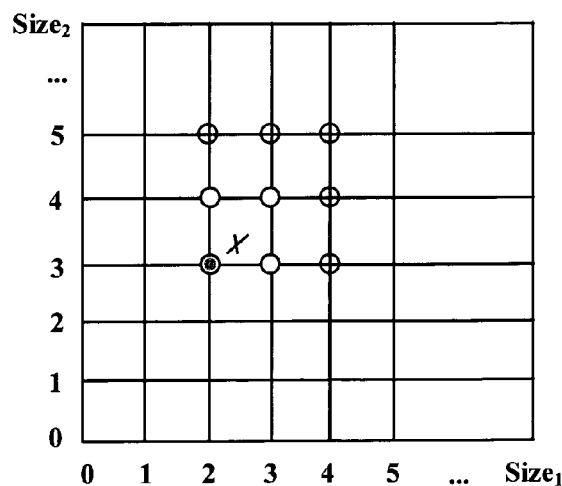

Using the above equation, finding the device pixel coordinate(x', y') with respect to the surface coordinate ($S_{x''}$, $S_{y''}$) in the shading space with the shading colour represented by a particular value of the parametric variables (u,v) involves computing the Bezier curve points (in the shading space) correspondent to the parametric variables, computing the correspondent surface coordinates in the shading space, converting the surface coordinates to the device space, and computing the correspondent shading colour (if the function dictionary is not defined in the shading dictionary), or the parametric value correspondent to the shading colour (if the function dictionary is defined), according to the parametric variables (u, v), by using linear interpolation algorithm. In raster image processing, such a requirement, i.e., to find the colour at a particular device pixel coordinate, is often encountered. According to an aspect of the present invention, this can be performed directly on the device space using a methodology 900 as shown in FIG. 9 as follows:

At 902: Map the control points of a patch to device domain using the shading transformation matrix [a" b" c" d" t"$_x$ t"$_y$]. There are twelve control points for four boundary curves in a patch of shading Type 6, but sixteen control points, including twelve boundary curve control points and four internal surface control points, in a patch of shading Type 7. The mapped control points constructs a closed path in the device space bounded by the transformed Bezier curves.

At 904: Identify the C boundary curves (correspondent to the two horizontal sides of the unit space for v=0.0 and v=1.0) and the D boundary curves (correspondent to two vertical sides for u=0.0 and u=1.0) among the four boundary curves of the device-domain patch, before the device-domain patch is mapped onto its correspondent unit space.

At 906: Paint the device space patch with solid device white first, expect from the shading operation whose Background colour is not defined and that is under the process of the internal caching scheme of the shading bitmap (where the initialization of the bitmap mask is equivalent to painting the patch white).

At 908 it is determined if the shading is type 6, if it is (yes) then at 910, find the four implicit control points ($P_{11}$, $P_{12}$, $P_{21}$, $P_{22}$) residing on the device-domain patch for shading Type 6. The two points on each device-domain C Bezier boundary curves at known u=1/3 and 2/3, and the two points on each device-domain D Bezier curves at known v=1/3 and 2/3 are hence calculated. An algorithm similar to De Casteljau algorithm is used to estimate these points. After that, the four surface points $P_{11}$=S(1/3, 2/3), $P_{12}$=S(2/3, 2/3), $P_{21}$=S(1/3, 1/3) and $P_{22}$=S(2/3, 1/3) in the device domain are computed as defined previously (but in the device space).

At 912: Divide all device space C and D curves of the mapped patch, respectively corresponding to the parameter v and u varying vertically and horizontally across the unit square, into a plurality of subsections, by exploiting the twelve mapped boundary control points as well as the four computed implicit control points in the device space for shading Type 6 or the four mapped internal control points for shading Type 7. The length of the C and D boundary Bezier curves in the device space, and the C and D Bezier control curves defined by the implicit control points for shading Type 6or the internal control points are estimated by using linear approximation as the sum of linear distances between start boundary control point, implicit or internal control points and end boundary control point [i.e., ($l_1 + l_2 + l_3 + l_4 + l_5 + l_6$) as shown in FIG. 4]. This provides the approximate span of the patch in device pixels, along u and v directions only. As a result, the unit parametric space with the parametric variable u and v in 0.0 to 1.0 inclusive is subdivided into number of steps along u and v axis respectively as given by one of the following two schemes:

Scheme I:
(1) In the horizontal direction, the u domain from 0.0 to 1.0 is divided into the number (nu) of steps that equals the product of the experimental factor (misPT=1.3) and the number of device curve pixels on the longest C control curves among the device-domain boundary C curves and the device horizontal C control curves defined by the device implicit control points for shading Type 6 or the mapped internal control points for shading Type 7 in the horizontal direction.
(2) In the vertical direction, the v domain from 0.0 to 1.0 is divided into the number (nv) of steps that equivalent to the number of device curve pixels on the longest D control curves among the device-domain boundary D curves and the device vertical D control curves defined by the device implicit control points for shading Type 6 or the mapped internal control points for shading Type 7 in the vertical direction.

Scheme II:
(1) In the vertical direction, the v domain from 0.0 to 1.0 is divided into the number (nv) of steps that equals the product of the experimental factor (misPT=1.3) and the number of device curve pixels on the longest D control curves among the device-domain boundary D curves and the device-domain vertical D control curves defined by the device implicit control points for shading Type 6 or the mapped internal control points for shading Type 7 in the vertical direction.
(2) In the horizontal direction, the u domain from 0.0 to 1.0 is divided into the number (nu) of steps that equivalent to the number of device curve pixels on the longest C control curves among the device-domain boundary C curves and the device horizontal C control curves defined by the device implicit control points for shading Type 6 or the mapped internal control points for shading Type 7 in the horizontal direction.

At 914: there are nu steps along u direction and nv steps along v direction, the step sizes in u and v directions are set to 1/nu and 1/nv respectively. The device space surface pixels, for each combination of u and v values for u=1, 1−1/nu, 1−2/nu . . . 1−u_step/nu . . . 0 and v=1, 1−1/nv, 1−2/nv . . . 1−v_step/nv . . . 0, are then computed, using De Casteljau algorithm for finding Bezier curve points corresponding to each u and v, and the previously defined equation for computing $S$ (in the device space).

At 916: the coordinates ($S_{x''}$, $S_{y''}$) in the device domain of the resulting surface point S of the mapped surface patch are examined against the traced last shaded surface point in the device domain, preventing from any duplicated mapping onto the previous mapped device pixel and ensuring oneto-one mapping between the parametric space (u, v) to the device space (x', y'). If the correspondent device pixel of the surface point has not been shaded, the device D (for the above division scheme I of the parametric domain) or C (for the above division in scheme II of the parametric domain) curve subsection from the previous shaded surface point to the current one is approximated using the linear subsection with anti-alias consideration as shown at 918. Otherwise (yes), go to step 914.

At 920 it is determined whether the current colour of the device curve pixel is white. If the current colour of the device pixel is white (yes), at 922 the shading colour is simply computed using bilinear interpolation of colour values defined for the corners of the patch and the current u and v values. Processing then returns to 914.

The above steps are repeated in the device space for all the patches contained in the shading geometrical shape defined in the shading dictionary. Therefore the shading operations are performed entirely in the device domain for rapid rendering. It should be noted that a patch (defined in shading Type 6 or 7) can appear to fold-over on itself. When a patch folds-over on itself, the cubic C and D Bezier curves on the patch can be intersecting or self-intersecting. That means the location of the pixels on the device space Bezier curve may change direction so that pixels are mapped onto previously mapped pixels as the value of u or v increases in the parametric space. For the case that more than one parametric value (u, v) is mapped to the same device pixel, only the shading colour correspondent to the largest value of u will be chosen to paint the device pixel if these parametric coordinates have the same value of v; Otherwise, only the shading colour correspondent to the largest value of v will be used. In the related invention, in order to deal with such situations, after a patch is mapped into the device domain the device-domain patch is painted with solid device white at 904. The parametric variable (u, v) are forced to be varied from 1.0 to 0.0, instead of from 0.0 to 1.0 at 914. Each device curve subsection is examined against the traced last shaded device coordinates at 916, and each device curve pixel with each device curve subsection is checked against the current device colour of the device pixel at step 920. Therefore, the correct one-to-one mapping between the unit space and the device patch are achieved. It should also be noted that the division scheme I and II of the above parametric domain are both tested with the same quality for all complicated cases using the patch based shading. The division scheme I of the unit space is recommended for Shading Type 6 and 7 operations due to higher performance.

Figure 5:
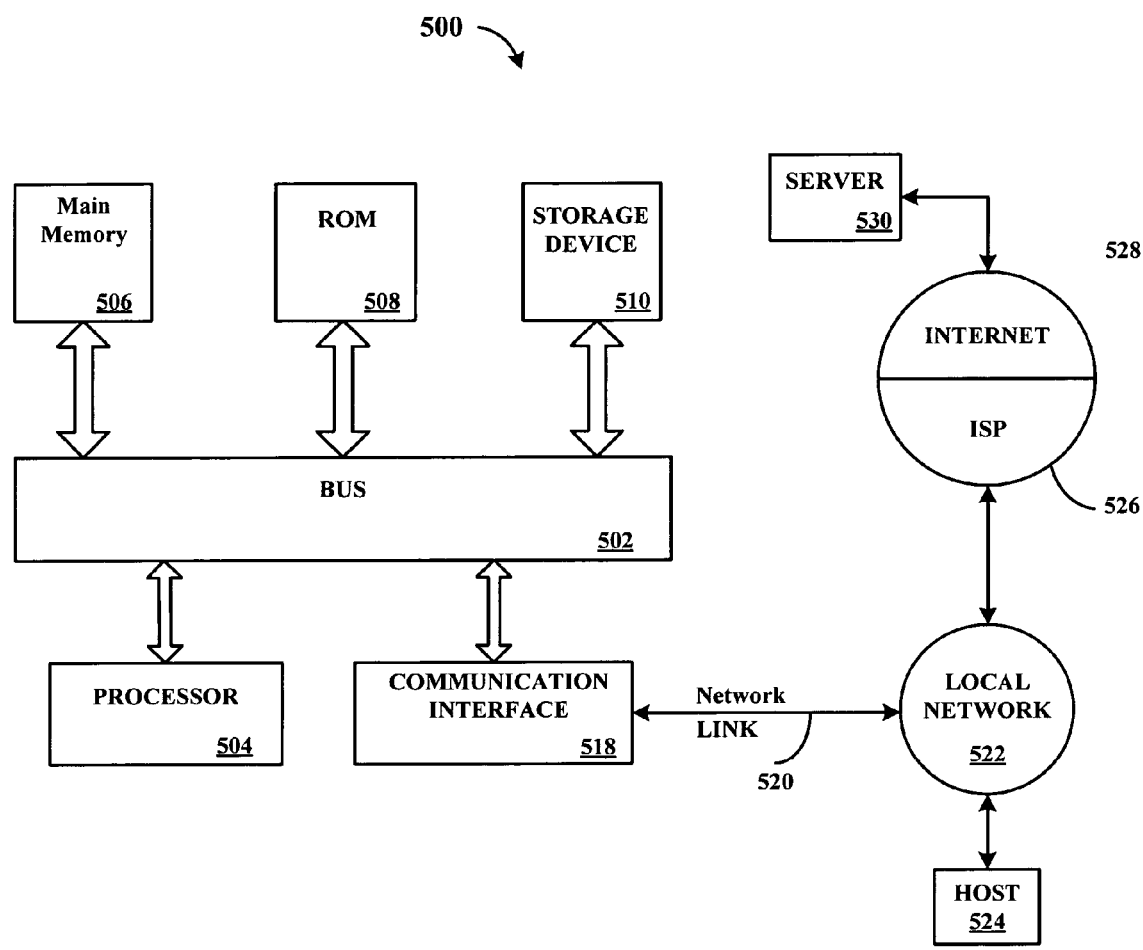
FIG. 5 is an illustration of a computer system for implementing the various aspects of the present invention.

FIG. 5 is a block diagram that illustrates a computer system 500 upon which any embodiment of the present invention may be implemented. A single computer system 500 can be used to implement the various functions of control unit 100, such as RIP operations 102 (FIG. 1), the Shading Module 104 (FIG. 1), and/or Painting Operations 106 (FIG. 1). Alternatively multiple computer systems 500 can be used to implement the functions of control unit 100.

Computer system 500 includes a bus 502 or other communication mechanism for communicating information and a processor 504 coupled with bus 502 for processing information. Computer system 500 also includes a main memory 506, such as random access memory (RAM) or other dynamic storage device coupled to bus 502 for storing information and instructions to be executed by processor 504. Main memory 506 also may be used for storing a temporary variable or other intermediate information during execution of instructions to be executed by processor 504. Computer system 500 further includes a ready only memory (ROM) 508 or other static storage device coupled to bus 502 for storing static information and instructions for processor 504. A storage device 550, such as a magnetic disk or optical disk, is provided and coupled to bus 502 for storing information and instructions.

The invention is related to the user of computer system 500 for image shading. According to one embodiment of the invention, image shading is provided by computer system 500 in response to processor 504 executing one or more sequences of one or more instructions contained in main memory 506. Such instructions may be read into main memory 506 from another computer-readable medium, such as storage device 510. Execution of the sequence of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to non-volatile media, volatile media, and transmission media. Non-volatile media include for example optical or magnetic disks, such as storage device 510. Volatile media include dynamic memory such as main memory 506. Transmission media include coaxial cables, copper wire and fiber optics, including the wires that comprise bus 502. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, any other memory chip or cartridge, a carrier wave as described hereinafter, or any other medium from which a computer can read.

Various forms of computer-readable media may be involved in carrying one or more sequences of one or more instructions to processor 504 for execution. For example, the instructions may initially be borne on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506 from which processor 504 retrieves and executes the instructions. The instructions received by main memory 506 may optionally be stored on storage device 510 either before or after execution by processor 504.

Computer system 500 also includes a communication interface 508 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communications through the worldwide packet data communication network, now commonly referred to as the "Internet" 528. Local networks 522 and Internet 528 both use electrical, electromagnetic, or optical signals that carry the digital data to and from computer system 500, are exemplary forms of carrier waves transporting the information.

Computer system 500 can send messages and receive data, including program codes, through the network(s), network link 520, and communication interface 518. In the Internet example, a server 530 might transmit a requested code for an application program through Internet 528, ISP 526, local network 522, and communication interface 518. In accordance with the invention, one such downloaded application provides for image shading as described herein.

The received code may be executed by processor 504 as it is received, and/or stored in storage device 510, or other non-volatile storage for later execution. In this manner, computer system 500 may obtain application code in the form of a carrier wave.

The image data to be processed by computer system 500 can be retrieved from storage device 510, main memory 506 or any non-volatile memory associated with computer system 500. In addition, image data can also be obtained from a remote location via communication interface 518. Remote devices coupled to local networks 522 or Internet 528 send the image data to network link 520 to be received by remote communication interface 518.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

What is claimed is:

1. A method for image shading, comprising:
   specifying a closed surface in a shading domain;
   defining colours for points located along the perimeter of the closed surface in the shading domain; and
   mapping the closed surface from the shading domain to a device domain, forming a device domain closed surface;
   wherein the mapping includes mapping the points with defined colours from points in the shading domain to points in the device domain.

2. The method of claim 1, further comprising:
   shading a point in the device domain bounded by the closed surface by interpolation based on the distance of the point from the points with defined colours in the device domain.

3. The method of claim 2,
   wherein the closed surface further comprising parametric circles;
   the mapping the closed surface further comprising merging a shading transform matrix with a radial shading equations of the parametric circles to produce a quadratic equation in terms of a parameter variable corresponding to the shading colour; and
   calculating a determinant for the quadratic equation;
   wherein the determinant indicates the existence of a defined colour when the value of the determinant is at least zero; and
   wherein a solution of the quadratic equation within the interval of 0.0 and 1.0 inclusive represents the parameter value corresponding to the shading colour.

4. The method of claim 3, further comprising calculating a plurality of constant parameters from the shading dictionary to rapidly compute the determinant of the quadratic equation.

5. The method of claim 3, wherein the parametric circles comprise:
   a starting circle having a center defined at a point $x''_0$ and $y''_0$ and a radius defined as $r''_0$, and
   an ending circle having a center defined at a second point $x''_1$ and $y''_1$ and a radius defined as $r''_1$;
   wherein the parametric circles are defined by blend equations:

$$x''_c(s) = x''_0 + s \times (x''_1 - x''_0)$$

$$y''_c(s) = y''_0 + s \times (y''_1 - y''_0)$$

$$r''(s) = r''_0 + s \times (r''_1 - r''_0)$$

where s ranges from 0.0 to 1.0 inclusive;
   wherein the shading transform matrix is defined for transforming a coordinate from shading coordinate space to $(x'', y'')$ to device coordinates $(x', y')$ using the shading transform matrix $a''$, $b''$, $c''$, $d''$, $t''_x$, $t''_y$ is given by the following equations:

$$x' = a''x'' + c''y'' + t''_x$$

$$y' = b''x'' + d''y'' + t''_y$$

the merging a shading transform matrix with a radial shading equations of parametric circles further comprising:
   combining $a''$, $b''$, $c''$, $d''$, $t''_x$, $t''_y$ with the blend circle equations to derive a
   quadratic equation $As^2 + Bs + C = 0$, where $$A = P0$$

$$B = dx' \times P1 + dy' \times P2 + P3,$$

$$C = dx' \times dx' \times P5 + dy' \times dy' \times P6 + dx' \times dy' \times P7 + P4,$$

$$dx' = x' - x'_0,$$

$$dy' = y' - y'_0;$$

wherein $(x', y')$ is the current device pixel coordinates that needs to be painted, and $(x'_0, y'_0)$ represents the centre coordinates of the starting circle in the device domain; wherein the plurality of constant parameters are:

$$P0 = (x''_1 - x''_0) \times (x''_1 - x''_0) + (y''_1 - y''_0) \times (y''_1 - y''_0) - (r''_1 - r''_0) \times (r''_1 - r''_0)$$

$$P1 = 2 \times [d'' \times (x''_1 - x''_0) - b'' \times (y''_1 - y''_0)]/P8$$

$$P2=-2\times[a''\times(y''_1-y''_0)-c''\times(x''_1-x''_0)]/P8$$

$$P3=-2\times[r''_0\times(r''_1-r''_0)]$$

$$P4=-(r''_1-r''_0)$$

$$P5=(d''\times d''+b''\times b'')/(P8\times P8)$$

$$P6=(c''\times c''+a''\times a'')/(P8\times P8)$$

$$P7=-2\times(c''\times d''+a''\times b'')/(P8\times P8)$$

$$P8=a''\times d''-b''\times c''.$$

6. The method of claim 5, further comprising:
computing constants P0, P1, P2, P3, P4, P5, P6, P7, P8 and ($x'_0$, $y'_0$) only once per each shading dictionary.

7. The method of claim 6, further comprising
computing only dx' and dy' values for per pixel computations.

8. The method of claim 3, further comprising:
computing the determinant of the above quadratic equation as
determinant ($\Delta$)=B×B−4×A×C;
wherein when the determinant is negative, the device pixel is outside the blending circle domain and need not to be painted, otherwise, a solution to the quadratic equation exists, and is given by:

$$s=(-B\pm\sqrt{\Delta})/(2\times A);$$

wherein a solution of $0.0\leq s\leq 1.0$ is considered as the valid solution for s; and
a corresponding parameter t is then computed using the equation:

$$t=t_0+s\times(t_1-t_0).$$

9. The method of claim 2, wherein the closed surface is triangular, wherein:
the mapping the closed surface further comprises mapping a region bounded by a triangle having vertexes A, B, C, each vertex A, B, C having an associated colour $C_A$, $C_B$, $C_C$ respectively from the shading domain to the device domain forming the device domain closed surface; and
the shading a point inside the device domain closed surface further comprising:
determining a scanline for a point to be rendered;
computing intersection points for the scanline;
computing a colour for each of the scanline intersection points based on interpolating the associated colours of the vertexes;
computing a colour for each of the scanline intersection points based on the colour increment along the same intersecting edges;
computing a colour for a point on the scanline based on interpolation of the colour for each of the scanline intersection points; and
computing a colour for a point on the scanline based on the colour increment along the scanline with the same intersecting points.

10. The method of claim 9, wherein there are two scanline intersection points having colours $C_{EDGE1}$ and $C_{EDGE2}$ respectively, the computing a colour for each of the scanline intersection is computed by:

$$C_{edge1}=[C_a\times(y'-y'_b)+C_b\times(y'_a-y')/(y'_a-y'_b); \text{ and}$$

$$C_{edge2}=[C_a\times(y'-y'_c)+C_c\times(y'_a-y')/(y'_a-y'_c);$$

wherein $C_a$, $C_b$, and $C_c$ represent the colours at the vertexes A, B, C of the triangle, $y'_a$, $y'_b$, and $y'_c$ represent the corresponding y coordinates for the vertexes A, B, C, and y' represents the y coordinate of the scanline intersection points.

11. The methof of claim 10, wherein for the same intersecting edges $C_{EDGE1}$ and $C_{EDGE2}$ respectively, the colour increments for corresponding scanlines are computed by:

$$IncrmC_{edge1}=(C_a-C_b)/(y'_a-y'_b); \text{ and}$$

$$IncrmC_{edge2}=(C_a-C_c)/(y'_a-y'_c);$$

Wherein the colours at the edges are computed by:

$$C_{edge1}=dy'\times IncrmC_{edge1}+C_{edge1(prev)} \text{ and}$$

$$C_{edge2}=dy'\times IncrmC_{edge2}+C_{edge2(prev)};$$

Where $C_{edge1(prev)}$ and $C_{edge2(prev)}$ represent the edge colours of the previous scanline.

12. The method of claim 10,
the computing a colour for a point on the scanline further comprising computing the x coordinates $x'_{edge1}$ and $x'_{edge2}$ for the scanline intersection points, wherein:

$$x'_{edge1}=x'_a+(x'_b-x'_a)\times(y'-y'_a)/(y'_b-y'_a),$$

$$x'_{edge2}=x'_a+(x'_c-x'_a)\times(y'-y'_a)/(y'_c-y'_a),$$

wherein $x'_a$, $x'_b$, $x'_c$ represent the x coordinate of the vertexes A, B, C.

13. The method of claim 12, wherein:
the computing a colour for a point on the scanline further comprising computing the colour based on the formula:

$$C(x', y')=[C_{edge1}\times(x'_{edge2}-x')+C_{edge2}\times(x'-x'_{edge1})/(x'_{edge2}-x'_{edge1});$$

wherein x' is the x coordinate for the point on the scanline, and C(x', y') represents the shading colour at device coordinates (x', y').

14. The method of claim 12, wherein for the same scanline, the colour increment is computed by:

colour increment=$IncrmC_{scaline}=(C_{edge2}-C_{edge1})/(x'_{edge2}-x'_{edge1});$ Wherein the colour at a point on the scanline is based on the formula:

$$C(x', y')=dx'\times IncrmC_{scanline}+C_{prev}(x'-dx', y')$$

Where dx' is the x coordinate increment relative to the previous point with colour $C_{prev}(x', y')$ on the same scanline.

15. The method of claim 2, wherein:
the image shading performs patch mesh based shading, the closed surface in the shading domain being defined by an area bounded by Bezier curves having boundary control points in the shading domain, and the boundary control points having an associated colour value;
the mapping the closed surface from the device domain to the shading mapping the boundary control points to the device domain further comprising using a coordinate transform matrix to construct a closed path formed of device space Bezier curves in a device domain; and
the shading a point inside the device domain closed surface further comprising:
painting the shading area with white colour;
computing the internal surface control points;
approximating the length of the device space Bezier curves in the device domain;
setting the step sizes for pixels in the device domain;
computing a shading colour using bilinear interpolation based on the colour values of the control points; and painting the shading colour only once per device pixel, traversing the u and v parameter space from 1.0 to 0.0.

16. The method for patch mesh based shading of claim 15, wherein the internal surface control points are computed:

$$P_{11}=S(1/3, 2/3), P_{12}=S(2/3, 2/3), P_{21}=S(1/3, 1/3)$$
and $P_{22}=S(2/3, 1/3)$ Where $S(u, v)$ is given by:

$$S=(1-v)\times C_1(u)+v\times C_2(u)+(1-u)\times D_1(v)+u\times D_2(v)-(1-v)\times[(1-u)\times C_1(0)+u\times C_1(1)]-v\times[(1-u)\times C_2(0)+u\times C_2(1)]$$

in which, $C_1$, $C_2$, $D_1$, $D_2$ represent the four Bazier curves.

17. The method of patch mesh based shading of claim 16, wherein at least four implicit control points are located.

18. The method for patch mesh based shading of claim 15, the approximating the length further comprising locating a plurality of implicit control points on each device space Bezier curve at known u and v values.

19. The method of patch mesh based shading as in claim 18, the approximating the length of device space Bezier curves further comprises summing the linear distances between the implicit control points.

20. The method of claim 19, wherein when there are nu pixels along a u direction and nv pixels along a v direction, where n is an integer greater than zero, the setting step sizes sets the step sizes in u and v directions to 1/nu and 1/nv respectively.

21. An apparatus for performing image shading, comprising:
a raster image processor for generating a raster image processed image in a shading domain;
a shading module; and
an image output device having defined pixels in a device domain
wherein the shading module is configured to receive the raster image processed image from the raster image processor and further configured to process the received image by:
specifying a closed surface in the shading domain;
defining colours for points located along the perimeter of the closed surface in the shading domain; and
mapping the closed surface from the shading domain to the device domain, forming a device domain closed surface;
wherein the mapping includes mapping the points with defined colours from points in the shading domain to points in the device domain; and
shading a point inside the device domain closed surface by interpolation based on the distance of the point from the points with defined colours in the device domain.

22. The apparatus of claim 21,
wherein the closed surface further comprising parametric circles;
the mapping the closed surface further comprising merging a shading transform matrix with a radial shading equations of the parametric circles to produce a quadratic equation in terms of a parameter variable corresponding to the shading colour; and
calculating a determinant for the quadratic equation;
wherein the determinant indicates the existence of a defined colour when the value of the determinant is at least zero; and
wherein a solution of the quadratic equation within the interval of 0.0 and 1.0 inclusive represents the parameter value corresponding to the shading colour;
the shading module further configured to calculating a plurality of constant parameters from the shading dictionary to rapidly compute the determinant of the quadratic equation;
wherein the parametric circles comprise:
a starting circle having a center defined at a point $x''_0$ and $y''_0$ and a radius defined as $r''_0$, and
an ending circle having a center defined at a second point $x''_1$ and $y''_1$ and a radius defined as $r''_1$;
wherein the parametric circles are defined by blend equations:

$$x''_c(s)=x''_0+s\times(x''_1-x''_0)$$

$$y''_c(s)=y''_0+s\times(y''_1-y''_0)$$

$$r''(s)=r''_0+s\times(r''_1-r''_0)$$

where s ranges from 0.0 to 1.0 inclusive;
wherein the colour transform matrix is defined for transforming a coordinate from shading coordinate space to $(x'', y'')$ to device coordinates $(x', y')$ using a shading transform matrix $a''$, $b''$, $c''$, $d''$, $t''_x$, $t''_y$ is given by the following equations:

$$x'=a''x''+c''y''+t''_x$$

$$y'=b''x''+d''y''+t''_y;$$

wherein the merging a shading transform matrix with a radial shading equations of parametric circles further comprising:
combining $a''$, $b''$, $c''$, $d''$, $t''_x$, $t''_y$ with the blend circle equations to derive a quadratic equation $As^2+Bs+C=0$, where $$A=P0,$$

$$B=dx'\times P1+dy'\times P2+P3,$$

$$C=dx'\times dx'\times P5+dy'\times dy'\times P6+dx'\times dy'\times P7+P4,$$

$$dx'=x'-x'_0,$$

$$dy'=y'-y'_0$$

$(x', y')$ is the current device pixel coordinates that needs to be painted, and
$(x'_0, y'_0)$ represents the centre coordinates of the starting circle in the device domain;
wherein the plurality of constant parameters are:

$$P0=(x''_1-x''_0)\times(x''_1-x_0)+(y''_1-y''_0)\times(y''_1-y''_0)-(r''_1-r''_0)\times(r''_1-r''_0)$$

$$P1=2\times[d''\times(x''_1-x''_0)-b''\times(y''_1-y''_0)]/P8$$

$$P2=-2\times[a''\times(y''_1-y''_0)-c''\times(x''_1-x''_0)]/P8$$

$$P3=-2\times[r''_0\times(r''_1-r''_0)]$$

$$P4=-(r''_1-r''_0)$$

$$P5=(d''\times d''+b''\times b'')/(P8\times P8)$$

$$P6=(c''\times c''+a''\times a'')/(P8\times P8)$$

$$P7=-2\times(c''\times d''+a''\times b'')/(P8\times P8)$$

$$P8=a''\times d''-b''\times c''$$

wherein the shading module is further configured to computing constants P0, P1, P2, P3, P4, P5, P6, P7, P8 and ($x'_0$, $y'_0$) only once per each shading dictionary, and only computing only dx' and dy' values for per pixel computations;

the shading module further configured to computing the determinant of the above quadratic equation as determinant $(\Delta) = B \times B - 4 \times A \times C$;

wherein when the determinant is negative, the device pixel is outside the blending circle domain and need not to be painted, otherwise, a solution to the quadratic equation exists, and is given by:

$s = (-B \pm \sqrt{\Delta})/(2 \times A)$;

wherein a solution of $0.0 \leq s \leq 1.0$ is considered as the valid solution for s; and a corresponding parameter t is then computed using the equation $t = t_0 + s \times (t_1 - t_0)$.

23. The method of claim 21, wherein the closed surface is triangular, wherein:

the mapping the closed surface further comprises mapping a region bounded by a triangle having vertexes A, B, C, each vertex A, B, C having an associated colour $C_A$, $C_B$, $C_C$ respectively from the shading domain to the device domain forming the device domain closed surface; and the shading a point inside the device domain closed surface further comprising:

determining a scanline for a point to be rendered;

computing intersection points for the scanline;

computing a colour for each of the scanline intersection points based on interpolating the associated colours of the vertexes;

computing a colour for each of the scanline intersection points based on the colour increment along the same intersecting edges;

computing a colour for a point on the scanline based on interpolation of the colour for each of the scanline intersection points; and computing a colour for a point on the scanline based on the colour increment along the scanline with the same intersecting points;

wherein there are two scanline intersection points having colours $C_{EDGE1}$ and $C_{EDGE2}$ respectively, the computing a colour for each of the scanline intersection is computed by:

$C_{edge1} = [C_a \times (y' - y'_b) + C_b \times (y'_a - y')]/(y'_a - y'_b)$; and $C_{edge2} = [C_a \times (y' - y'_c) + C_c \times (y'_a - y')]/(y'_a - y'_c)$;

wherein $C_a$, $C_b$, and $C_c$ represent the colours at the vertexes A, B, C of the triangle, $y'_a$, $y'_b$, and $y'_c$ represent the corresponding y coordinates for the vertexes A, B, C, and y' represents the y coordinate of the scanline intersection points;

wherein for the same intersecting edges $C_{EDGE1}$ and $C_{EDGE2}$ respectively, the colour increments for corresponding scanlines are computer by:

$IncrmC_{edge1} = (C_a - C_b)/(y'_a - y'_b)$; and $IncrmC_{edge2} = (C_a - C_c)/(y'_a - y'_c)$;

wherein the colours at the edges are computed by:

$C_{edge1} = dy' \times IncrmC_{edge1} + C_{edge1(prev)}$ and $C_{edge2} = dy' \times IncrmC_{edge2} + C_{edge2(prev)}$;

where $C_{edge1(prev)}$ and $C_{edge2(prev)}$ represent the edge colours of the previous scanline;

the computing a colour for a point on the scanline further comprising computing the x coordinates $x'_{edge1}$ and $x'_{edge2}$ for the scanline intersection points, wherein:

$x'_{edge1} = x'_a + (x'_b - x'_a) \times (y' - y'_a)/(y'_b - y'_a)$, $x'_{edge2} = x'_a + (x'_c - x'_a) \times (y' - y'_a)/(y'_c - y'_a)$, wherein $x'_a$, $x'_b$, $x'_c$ represent the x coordinate of the vertexes A, B, C, the computing a colour for a point on the scanline further comprising computing the colour based on the formula:

$C(x', y') = [C_{edge1} \times (x'_{edge2} - x') + C_{edge2} \times (x' - x_{edge1})]/(x'_{edge2} - x'_{edge1})$;

wherein x' is the x coordinate for the point on the scanline, and C(x', y') represents the shading colour at device coordinates (x', y');

wherein for the same scanline, the colour increment is computed by:

$IncrmC_{scanline} = (C_{edge2} - C_{edge1})/(x'_{edge2} - x'_{edge1})$;

wherein the colour at a point on the scanline is based on the formula:

$C(x', y') = dx' \times IncrmC_{scanline} + C_{prev}(x' - dx', y')$ where dx' is the x coordinate increment relative to the previous point with colour $C_{prev}(x', y')$ on the same scanline.

24. The apparatus of claim 21, wherein:

the shading module is further configured for performing patch mesh based shading, the closed surface in the shading domain being defined by an area bounded by Bezier curves having boundary control points in the shading domain, and the boundary control points having an associated colour value;

the mapping the closed surface from the device domain to the shading mapping the boundary control points to the device domain further comprising using a coordinate transform matrix to construct a closed path formed of device space Bezier curves in a device domain; and the shading a point inside the device domain closed surface further comprising:

painting the shading area with a white colour;

computing internal surface control points using:

$P_{11} = S(1/3, 2/3)$, $P_{12} = S(2/3, 2/3)$, $P_{21} = S(1/3, 1/3)$ and $P_{22} = S(2/3, 1/3)$ where S(u, v) is given by:

$S = (1-v) \times C_1(u) + v \times C_2(u) + (1-u) \times D_1(v) + u \times D_2(v) - (1-v) \times [(1-u) \times C_1(0) + u \times C_1(1)] - v \times [(1-u) \times C_2(0) + u \times C_2(1)]$ wherein $C_1$, $C_2$, $D_1$, $D_2$ represent the four Bazier curves;

approximating the length of the device space Bezier curves in the device domain, the approximating the length further comprising locating a plurality of implicit control points on each device space Bezier curve at known u and v values;

setting the step sizes for pixels in the device domain; and computing a shading colour using bilinear interpolation based on the colour values of the control points;

wherein at least four implicit control points are located;

wherein the approximating the length of device space Bezier curves further comprises summing the linear distances between the implicit control points; and wherein when there are nu pixels along u direction and nv pixels along v direction, where n is an integer greater than zero, the setting step sizes sets the step sizes in u and v directions to 1/nu and 1/nv respectively; and painting the shading colour only once per device pixel, traversing the u and v parameter space from 1.0 to 0.0.

25. A computer-readable medium storing a computer program product and having computer program logic recorded thereon for performing image shading, comprising:

means suitably adapted for generating a raster image processed image in a shading domain;

means suitably adapted for receiving the processed image; and means responsive to means suitably adapted for receiving the processed image suitably adapted for translating the image to a device domain for an associated output device;

the means suitably adapted for translating the image further comprising means suitably adapted for shading the image; and wherein the means suitably adapted for shading the image comprising:

means suitably adapted for specifying a closed surface in the shading domain;

means suitably adapted for defining colours for points located along the perimeter of the closed surface in the shading domain; and means suitably adapted for mapping the closed surface from the shading domain to the device domain, forming a device domain closed surface;

wherein the mapping includes mapping the points with defined colours from points in the shading domain to points in the device domain; and shading a point inside the device domain closed surface by interpolation based on the distance of the point from the points with defined colours in the device domain.

* * * * *